United States Patent
Agiwal et al.

(10) Patent No.: US 10,743,161 B2
(45) Date of Patent: Aug. 11, 2020

(54) METHOD FOR DISCRIMINATING BETWEEN UNICAST DEVICE TO DEVICE(D2D) COMMUNICATION AND GROUPCAST D2D COMMUNICATION

(71) Applicant: Samsung Electronics Co., Ltd., Gyeonggi-do (KR)

(72) Inventors: Anil Agiwal, Tubarhalli (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 15/553,964

(22) PCT Filed: Feb. 25, 2016

(86) PCT No.: PCT/KR2016/001855
§ 371 (c)(1),
(2) Date: Aug. 25, 2017

(87) PCT Pub. No.: WO2016/137245
PCT Pub. Date: Sep. 1, 2016

(65) Prior Publication Data
US 2018/0054693 A1    Feb. 22, 2018

(30) Foreign Application Priority Data

Feb. 26, 2015 (IN) .............................. 927/CHE/2015
Feb. 18, 2016 (IN) .............................. 927/CHE/2015

(51) Int. Cl.
*G06F 13/00* (2006.01)
*H04W 4/70* (2018.01)
(Continued)

(52) U.S. Cl.
CPC ........... *H04W 4/70* (2018.02); *H04L 12/5601* (2013.01); *H04W 4/06* (2013.01); *H04W 76/14* (2018.02);
(Continued)

(58) Field of Classification Search
CPC ....... H04W 76/14; H04W 4/06; H04W 80/02; H04W 4/70; H04W 88/02; H04L 12/5601; H04L 2012/5641
(Continued)

(56) References Cited

U.S. PATENT DOCUMENTS 9,596,711 B2 * 3/2017 Kwon ..................... H04L 12/18
9,980,173 B2 * 5/2018 Lee .......................... H04L 67/12
(Continued)

FOREIGN PATENT DOCUMENTS

| CN | 101754063 A | 6/2010 |
| CN | 104284366 A | 1/2015 |
| KR | 10-2015-0104963 A | 9/2015 |

OTHER PUBLICATIONS

Intel Corporation; "MAC PDU Format for D2D Communication"; 3GPP TSG RAN WG2 Meeting #85; R2-140319; Prague, Czech Republic; Feb. 10-14, 2014; 3 pages.
(Continued)

*Primary Examiner* — Kenneth R Coulter

(57) ABSTRACT

Embodiments herein disclose a method for identifying a unicast Device to Device (D2D) communication. Further, the method includes generating, by a source User Equipment (UE), a D2D Media Access Control (MAC) Protocol Data Unit (PDU) comprising a unicast parameter. Further, the method includes transmitting, by the source UE, the D2D MAC PDU to the destination UE. Further, the method includes receiving, by the destination UE, the D2D MAC PDU. Further, the method includes detecting, by the desti- (Continued)

nation UE, one of unicast parameters and groupcast parameters of the D2D MAC PDU. Furthermore, the method includes identifying, by the UE, the D2D MAC PDU is for one of the unicast D2D communication when the unicast parameters are detected, and the groupcast D2D communication when the groupcast parameters are detected.

16 Claims, 27 Drawing Sheets

(51) Int. Cl.
    *H04W 76/14*     (2018.01)
    *H04W 4/06*     (2009.01)
    *H04W 80/02*     (2009.01)
    *H04L 12/54*     (2013.01)
    *H04W 88/02*     (2009.01)
    *H04L 12/70*     (2013.01)

(52) U.S. Cl.
    CPC ..... *H04W 80/02* (2013.01); *H04L 2012/5641* (2013.01); *H04W 88/02* (2013.01)

(58) Field of Classification Search
    USPC .......................................... 709/232, 230, 245
    See application file for complete search history.

(56) References Cited

U.S. PATENT DOCUMENTS

| | | | | |
|---|---|---|---|---|
| 10,027,729 | B2* | 7/2018 | Cheng | H04W 76/14 |
| 10,110,713 | B2* | 10/2018 | Agiwal | H04L 69/22 |
| 10,117,284 | B2* | 10/2018 | Kwon | H04L 12/18 |
| 10,129,902 | B2* | 11/2018 | Kaur | H04W 56/002 |
| 10,154,402 | B2* | 12/2018 | Agiwal | H04W 4/70 |
| 10,485,018 | B2* | 11/2019 | Agiwal | H04W 72/1289 |
| 2010/0157994 | A1 | 6/2010 | Beisel et al. | |
| 2012/0226822 | A1 | 9/2012 | Norair | |
| 2012/0230243 | A1 | 9/2012 | Lee et al. | |
| 2013/0013497 | A1* | 1/2013 | Ayala | G06Q 40/00 705/39 |
| 2013/0250771 | A1 | 9/2013 | Yu et al. | |
| 2014/0094119 | A1 | 4/2014 | Stojanovski et al. | |
| 2015/0257187 | A1* | 9/2015 | Kwon | H04L 12/18 370/329 |
| 2016/0344782 | A1* | 11/2016 | Cheng | H04W 76/14 |
| 2017/0142741 | A1* | 5/2017 | Kaur | H04W 56/002 |
| 2017/0142768 | A1* | 5/2017 | Kwon | H04L 12/18 |
| 2017/0272384 | A1* | 9/2017 | Lee | H04W 4/40 |

OTHER PUBLICATIONS

The First Office Action in connection with Chinese Application No. 201680012563.X dated May 29, 2020, 21 pages.
Intel Corporation, "Support of one-to-one communication," R2-151112, 3GPP TSG-RAN WG2 #89bis, Bratislava, Slovakia, Apr. 20-24, 2015, 4 pages.
Ericsson, "Introduction of eD2D," R2-157150, 3GPP TSG-RAN WG2 Meeting #92, Anaheim, USA, Nov. 16-20, 2015, 24 pages.
Ericsson, "ProSe Layer-2 Identifiers," R2-144470, 3GPP TSG-RAN WG2 #87bis, Shanghai, China, Oct. 6-10, 2014, 5 pages.
Ericsson, "Introduction of ProSe," R2-145064, 3GPP TSG-RAN WG2 Meeting #88, San Francisco, USA, Nov. 17-21, 2014, 26 pages.
ZTE, "MAC PDU format for D2D communication," R2-141491, 3GPP TSG-RAN WG2 Meeting #85bis, Valencia, Spain, Mar. 31-Apr. 4, 2014, 4 pages.

* cited by examiner

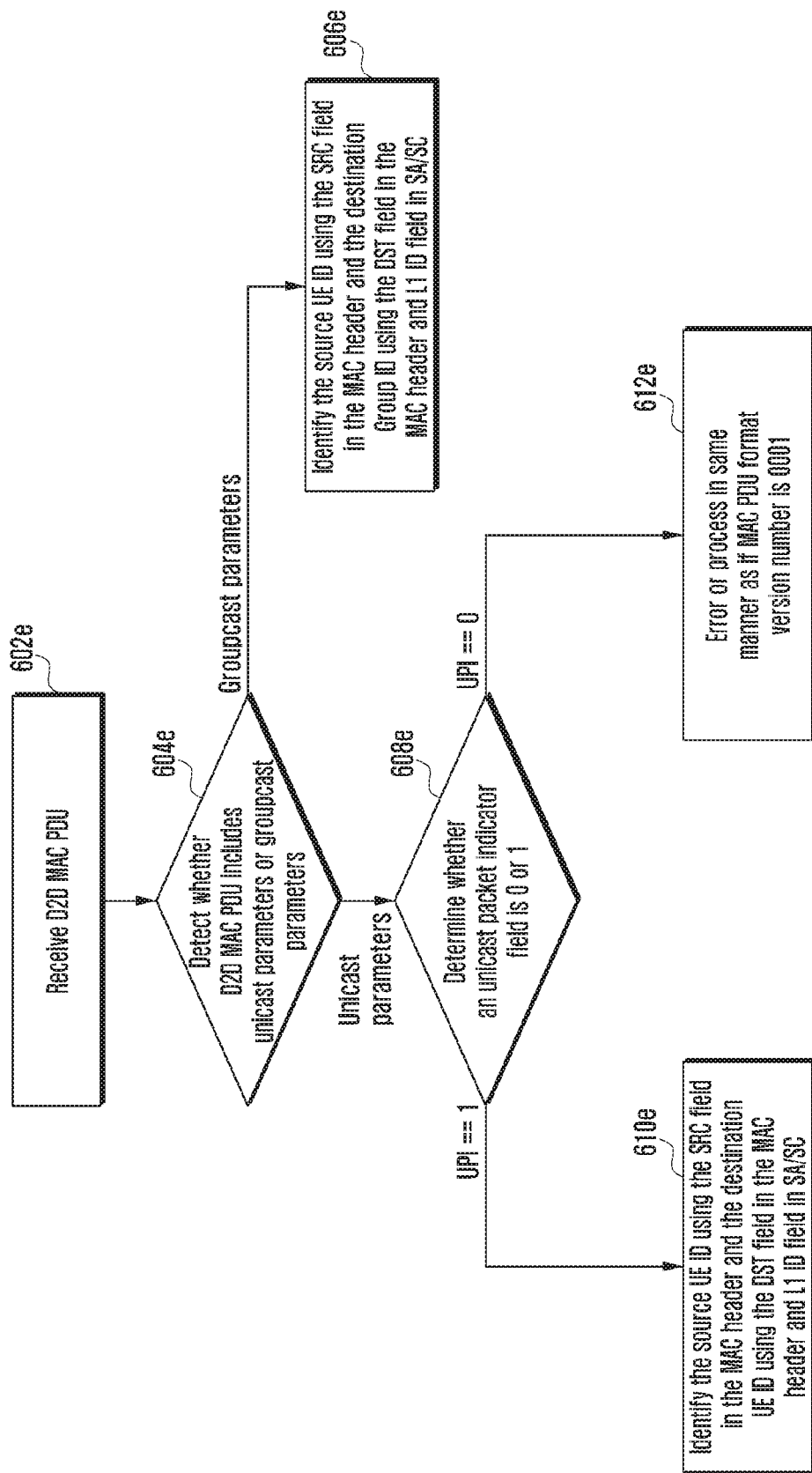

SRC: Source UE ID
SRC GRP ID: Group ID of source
DST UE ID: Destination UE ID
DST : 16 MSB of Group ID of destination SRC: Source UE ID
SRC GRP ID: Group ID of source
DST UE ID: Destination UE ID
DST : 16 MSB of Group ID of destination SRC: Source UE ID DST UE ID: Destination UE ID DST : 16 MSB of Group ID of destination SRC: Source UE ID
DST UE ID: Destination UE ID
DST : 16 MSB of Group ID of destination MAC header of Unicast D2D MAC PDU

| MAC PDU format version = 1 or '0001' [4 bits] | Reserved [4 bits] | SRC [24 bits] | DST [16 bits] | DST GRP ID [24 bits] | SRC GRP ID [24 bits] | MAC Sub-header[s] | Payload (MAC SDU[s], padding) |

SRC: Source UE ID

DST : 16 MSB of DST UE ID

SRC GRP ID: Group ID of source

DST UE ID: Group ID of Destination

SRC GRP ID and DST GRP ID are included if DST UE ID is included in DST field and SA SRC: Source UE ID DST : 16 MSB of DST UE ID GRP ID: Group ID of Source/destination UE GRP ID is included if DST UE ID is included in DST field and SA

METHOD FOR DISCRIMINATING BETWEEN UNICAST DEVICE TO DEVICE(D2D) COMMUNICATION AND GROUPCAST D2D COMMUNICATION

CROSS-REFERENCE TO RELATED APPLICATIONS AND CLAIM OF PRIORITY

The present application claims priority under 35 U.S.C. § 365 to International Patent Application No. PCT/KR2016/001855 filed on Feb. 25, 2016, entitled "METHOD FOR DISCRIMINATING BETWEEN UNICAST DEVICE TO DEVICE (D2D) COMMUNICATION AND GROUPCAST D2D COMMUNICATION", and through Indian Patent Application No. 927/CHE/2015, which was filed on Feb. 26, 2015, and Indian Patent Application No. 927/CHE/2015, which was filed on Feb. 18, 2016, each of which are incorporated herein by reference into the present disclosure as if fully set forth herein.

TECHNICAL FIELD

The present embodiments relate to a wireless communication system, and more particularly to a mechanism for discriminating between a unicast device to device (D2D) communication and a groupcast D2D communication. The present application is based on, and claims priority from an Indian Application Number 927/CHE/2015 filed on 26 Feb. 2015, the disclosure of which is hereby incorporated by reference herein.

BACKGROUND

Device to Device (D2D) communication is being studied in communication standard groups to enable data communication services between User Equipment's (UEs). During the D2D communication a transmitting D2D UE (i.e., source UE) can transmit data packets to a group of D2D UEs (i.e., destination UE) or broadcast data packets to all the D2D UEs. The D2D communication between a transmitter and receiver(s) is connectionless in nature (i.e. there is no connection setup (or no control messages are exchanged) between the transmitter and a receiver) before the transmitter starts transmitting the data packets. During the transmission, the transmitter includes source identification (ID) and destination ID in the data packets. The source ID is set to the UE ID of the transmitter. The destination ID is the intended recipient of the transmitted packet. The destination ID indicates whether the packet is a broadcast packet or a packet intended for a group. The destination ID for broadcast is an ID reserved from group IDs. The UE is assigned a D2D UE ID for its associated group.

A D2D Media Access Control (MAC) Protocol Data Unit (PDU) for carrying one or more MAC Service Data Units (SDUs) for the D2D communication includes a MAC header and a MAC payload. The payload comprises of one or more MAC SDUs corresponding to same destination i.e. group or broadcast. The source (SRC) field in the MAC header is set to D2D UE identifier (ID) of the source. The D2D UE ID is unique within the group i.e. each member of the group has distinct D2D UE ID. The destination (DST) field in the MAC header is set to 16 most significant bits (MSBs) of 24 bit D2D Layer-2 group ID of the destination group. The 8 least significant bits (LSBs) of 24 bit D2D Layer-2 group ID is transmitted in Scheduling Assignment (SA) or Scheduling Control (SC) information. The SA or SC information is transmitted prior to transmission of D2D MAC PDU. The current D2D MAC PDU format does not support a unicast D2D communication i.e., D2D MAC PDU cannot be addressed to a destination UE.

SUMMARY

Currently, the D2D UE ID is only unique within the group. So that, the D2D UE ID of two UEs belonging to different groups can be same. Also, the D2D UE ID and D2D Layer-2 group ID can also be same. If the unicast D2D MAC PDU destined to the UE is sent by setting the destination Layer-2 ID field in the MAC header to D2D UE ID then:

The D2D MAC PDU will be processed by another UE whose D2D UE ID is same as the D2D UE ID in the DST field of the D2D MAC PDU. The D2D MAC PDU will be wrongly processed by members of group whose group ID is same as the D2D UE ID in the DST field of the D2D MAC PDU. The D2D MAC PDU addressed to the D2D UE ID is wrongly processed by the UE as the D2D MAC PDU addressed to the D2D Layer 2 group ID if the D2D Layer 2 Group ID and the D2D UE ID of the UE are same.

Thus, it is desired to address the above mentioned disadvantages or other shortcomings or at least provide a useful alternative.

The embodiments herein achieve a method for discriminating between a unicast D2D communication and a groupcast D2D communication. The method includes receiving, by a User Equipment (UE), a D2D Media Access Control (MAC) Protocol Data Unit (PDU). Further, the method includes detecting, by the UE, one of unicast parameters and groupcast parameters of the D2D MAC PDU. Furthermore, the method includes identifying, by the UE, the D2D MAC PDU is for one of the unicast D2D communication when the unicast parameters are detected, and the groupcast D2D communication when the groupcast parameters are detected.

In an embodiment, the unicast parameter includes at least one of a unicast D2D MAC PDU format version, a unicast packet indicator, a scrambled Cyclic Redundancy Check (CRC) of a Scheduling Assignment (SA), a number of bits, values, size associated with at least one of an identifier of a source UE, a group identifier of a source UE, and an identifier of a destination UE.

In an embodiment, the groupcast parameter includes at least one of a groupcast D2D MAC PDU format version, an unscrambled CRC of the SA, the number of bits, values, size associated with at least one of an identifier of the source UE, a group identifier of the source UE, and an identifier of the destination UE.

In an embodiment, the D2D MAC PDU, for the unicast D2D communication, includes the unicast D2D MAC PDU format version, reserved bits, the identifier of the source UE, a unicast identifier of the destination UE, MAC sub-headers, and a unicast MAC Service Data Unit (SDU).

In an embodiment, the D2D MAC PDU, for the unicast D2D communication, includes the unicast D2D MAC PDU format version, reserved bits having a unicast packet indicator, an identifier of the source UE, the unicast identifier of the destination UE, the MAC sub-headers, and the unicast MAC SDU.

In an embodiment, the D2D MAC PDU, for the unicast D2D communication across groups, includes at least one of the unicast D2D MAC PDU format version, the reserved bits, the identifier of the source UE, the group identifier of the source UE, the unicast identifier of the destination UE, the group identifier of the destination UE, the MAC sub-headers, and the unicast MAC SDU.

In an embodiment, the D2D MAC PDU, for the unicast D2D communication within a group, includes at least one of the unicast D2D MAC PDU format version, the reserved bits, the identifier of the source UE, the unicast identifier of the destination UE, the group identifier of the destination UE, the MAC sub-headers, and the unicast MAC SDU.

In an embodiment, the D2D MAC PDU, for the unicast D2D communication for one of within the group and across the groups, includes at least one of the unicast D2D MAC PDU format version, the reserved bits including the group identifier, the identifier of the source UE, the unicast identifier of the destination UE, the group identifier of the destination UE, the MAC sub-headers, and the unicast MAC SDU.

In an embodiment, the D2D MAC PDU, for the groupcast D2D communication, includes at least one of a groupcast D2D MAC PDU format version, the reserved bits, the identifier of the source UE, the group identifier of the source UE, the identifier of the destination UE, a groupcast identifier of the destination UE, the MAC sub-headers, and a groupcast MAC SDU.

The embodiments herein achieve a method for identifying a unicast D2D communication. The method includes generating, by a source User Equipment (UE), a D2D Media Access Control (MAC) Protocol Data Unit (PDU) including a unicast parameter to identify the D2D MAC PDU for the unicast D2D communication at a destination UE. Further, the method includes transmitting, by the source UE, the D2D MAC PDU to the destination UE.

The embodiments herein achieve a User Equipment (UE) for discriminating between a unicast D2D communication and a groupcast D2D communication. The UE is configured to receive a D2D Media Access Control (MAC) Protocol Data Unit (PDU) and detect one of unicast parameters and groupcast parameters of the D2D MAC PDU. Further, the UE is configured to identify that the D2D MAC PDU is for one of the unicast D2D communication when the unicast parameters are detected, and the groupcast D2D communication when the groupcast parameters are detected.

The embodiments herein achieve a User Equipment (UE) for identifying a unicast D2D communication. The UE is configured to generate a D2D Media Access Control (MAC) Protocol Data Unit (PDU) including a unicast parameter to identify the D2D MAC PDU for the unicast D2D communication at a destination UE. Further, the UE is configured to transmit the D2D MAC PDU to the destination UE.

The embodiments herein provide a computer program product including a computer executable program code recorded on a computer readable non-transitory storage medium. The computer executable program code when executed causing the actions including receiving, by a User Equipment (UE), a D2D Media Access Control (MAC) Protocol Data Unit (PDU). The computer executable program code when executed causing the actions including detecting, by the UE, one of unicast parameters and groupcast parameters of the D2D MAC PDU. The computer executable program code when executed causing the actions including identifying, by the UE, the D2D MAC PDU is for one of the unicast D2D communication when the unicast parameters are detected, and the groupcast D2D communication when the groupcast parameters are detected.

The embodiments herein provides a computer program product including a computer executable program code recorded on a computer readable non-transitory storage medium. The computer executable program code when executed causing the actions including generating, by a source User Equipment (UE), a D2D Media Access Control (MAC) Protocol Data Unit (PDU) including a unicast parameter to identify the D2D MAC PDU for the unicast D2D communication at a destination UE. The computer executable program code when executed causing the actions including transmitting, by the source UE, the D2D MAC PDU to the destination UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This disclosure provides a method for discriminating between a unicast Device to Device (D2D) communication and a groupcast D2D communication. According to the method provided by the present disclosure, effective discrimination between a unicast Device to Device (D2D) communication and a groupcast D2D communication is possible.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 6e is a flow diagram illustrating destination UE operations while discriminating a unicast D2D communication and a groupcast D2D communication using a unicast packet indicator, according to an embodiment as disclosed herein;

DETAILED DESCRIPTION

Figure 1:
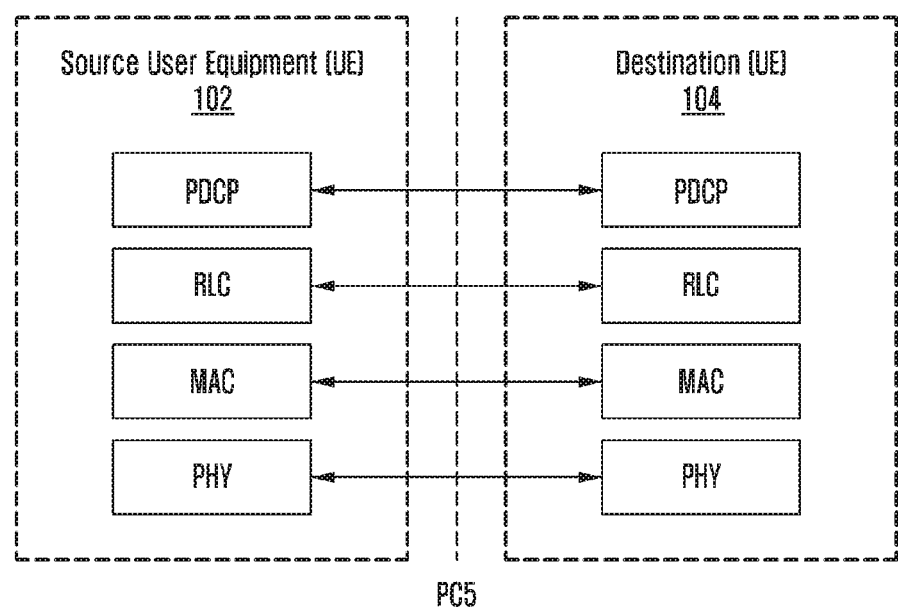
FIG. 1 is a block diagram illustrating a protocol stack for a Device to Device (D2D) communication, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for discriminating between a Device to Device (D2D) unicast D2D communication and a groupcast D2D communication. The method includes receiving, by a User Equipment (UE), a D2D Media Access Control (MAC) Protocol Data Unit (PDU). Further, the method includes detecting, by the UE, one of unicast parameters and groupcast parameters of the D2D MAC PDU. Furthermore, the method includes identifying, by the UE, the D2D MAC PDU is for one of the unicast D2D communication when the unicast parameters are detected, and the groupcast D2D communication when the groupcast parameters are detected.

The embodiments herein disclose a method for identifying a unicast D2D communication and groupcast D2D communication. The method includes generating, by a source User Equipment (UE), a D2D MAC PDU including a unicast parameter to identify the D2D MAC PDU for the unicast D2D communication at a destination UE. The method includes generating, by the source UE, the D2D MAC PDU including a groupcast parameter to identify the D2D MAC PDU for the groupcast D2D communication at the destination UE. Further, the method includes transmitting, by the source UE, the D2D MAC PDU to the destination UE.

Unlike the conventional systems and methods, the proposed method indicates whether the D2D MAC PDU carries the unicast or groupcast MAC SDUs using distinct values of the D2D MAC PDU format version number. The proposed method indicates whether the destination field in MAC header of D2D MAC PDU is a unicast identifier or a group identifier using the distinct values of the D2D MAC PDU format version number. The proposed method indicates whether the source field in the MAC header of D2D MAC PDU is the D2D UE identifier for the D2D unicast communication or the D2D groupcast communication using the distinct values of the D2D MAC PDU format version number. The proposed method can be used to indicate whether the D2D MAC PDU carries the unicast or groupcast MAC SDUs using a scrambled and unscrambled Cyclic Redundancy Check (CRC) of a Scheduling Assignment (SA) (i.e., scrambled CRC using a predefined CRC mask for the SA corresponding to the unicast D2D MAC PDU and unscrambled CRC for the SA corresponding to a non-unicast D2D MAC PDU). The proposed method indicates whether the destination field in the MAC header of the D2D MAC PDU is the unicast identifier or the group identifier using a scrambled and unscrambled Cyclic Redundancy Check (CRC) of a Scheduling Assignment (SA) (i.e., scrambled CRC using a predefined CRC mask for the SA corresponding to the unicast D2D MAC PDU and unscrambled CRC for the SA corresponding to a non-unicast D2D MAC PDU). The proposed method indicates whether the source field in the MAC header of the D2D MAC PDU is a D2D UE identifier for the D2D unicast communication or the D2D group cast communication using the scrambled and unscrambled CRC of the SA (i.e., scrambled CRC using a predefined CRC mask for the SA corresponding to the unicast D2D MAC PDU and unscrambled CRC for the SA corresponding to a non-unicast D2D MAC PDU). The proposed method can be used to encode or decode the different values and sizes in a source (SRC) field/destination (DST) field of MAC header depending on whether the D2D MAC PDU carries unicast or groupcast MAC SDUs. The proposed method avoids the collision between the D2D UE ID and the D2D Layer-2 group ID. The proposed method avoids the collision between D2D UE ID of two UEs.

The proposed method can be used to indicate whether the D2D MAC PDU carries the unicast MAC SDUs using D2D MAC PDU format version number and unicast Packet Indicator (UPI). The proposed method can be used to indicate whether the D2D MAC PDU carries the unicast MAC SDUs using the unicast packet indicator and the scrambled CRC of the SA information (i.e., scrambled CRC using predefined CRC mask for the SA corresponding to the unicast D2D MAC PDU and the unscrambled CRC for the SA corresponding to the non-unicast D2D MAC PDU). The proposed method can be used to encode/decode of the SRC/DST UE ID/DST fields in case of the unicast D2D MAC PDU and encode/decode the SRC/DST fields in case of non-unicast D2D MAC PDU. The proposed method avoids the collision between the D2D UE ID and the D2D Layer-2 group ID. The proposed method can be used to avoid the collision between D2D UE ID of two UEs.

For example, the MAC PDU format version number field indicates which version of a Sidelink Shared Channel (SL-SCH) subheader is used. In this version of the specification two format versions are defined, and this field shall therefore be set to "0001" or "0010". The V field size is 4 bits. SRC: The Source Layer-2 ID field carries the identity of the source. It is set to the ProSe UE ID. The SRC field size is 24 bits. If the V field is set to "0001" this identifier is the groupcast identifier. If the V field is set to "0010" this identifier is a unicast identifier. DST: The DST field carries the 16 most significant bits of the Destination Layer-2 ID. The Destination Layer-2 ID is set to the ProSe Layer-2 Group ID or ProSe UE ID. If the V field is set to "0001" this identifier is the groupcast identifier. If the V field is set to "0010" this identifier is the unicast identifier.

Further, the proposed method can be used to determine the presence of the unicast packet indicator field in the MAC header using the D2D MAC PDU format version number or the scrambled CRC of the SA. The proposed method can be used to encode/decode the different values and sizes in the SRC/DST fields of the MAC header depending on whether the D2D MAC PDU carries unicast or groupcast MAC SDUs.

Referring now to the drawings and more particularly to FIGS. 1 through 11, where similar reference characters denote corresponding features consistently throughout the figure, there are shown preferred embodiments.

The protocol stack for a device to device (D2D) communication is illustrated in the FIG. 1. A Packet Data Convergence Protocol (PDCP) layer in a communication unit 202 receives data packets i.e. internet protocol (IP) packets (i.e., PDCP Service Data Unit (SDU)) from an upper layer. It secures the packet and also compresses the IP headers. The processed packet (i.e., PDCP Protocol Data Unit (PDU)) is sent to a Radio Link Control (RLC) layer. The RLC layer receives the PDCP PDUs (i.e., RLC SDUs) from the PDCP layer. It fragments the PDCP PDUs if needed and sends the RLC PDUs to a D2D Media Access Control (MAC) layer. The MAC layer multiplexes the RLC PDUs (or MAC SDUs) and sends the D2D MAC PDU to a physical (PHY) layer for transmission on a wireless channel (e.g. PC5 interface or the like).

The D2D MAC PDU for carrying the MAC SDU(s) for the D2D communication includes of the MAC header and a MAC payload. The payload comprises of one or more MAC SDUs corresponding to same destination i.e. group or broadcast. There exists one sub-header in the MAC header corresponding to each MAC SDU in the MAC payload. The subheader indicates the length of the MAC SDU and logical channel ID (LCID) of logical channel associated with the MAC SDU. A D2D MAC PDU format version number field is also included in the MAC header. It is set to value one (i.e., in the binary form 0001). In an embodiment, it is set to value two (i.e., in the binary form 0010). The D2D MAC PDU format version number is included in every D2D MAC PDU transmitted. It is present at the beginning of the D2D MAC PDU header.

In an embodiment, the MAC PDU format version number field indicates which version of a Sidelink Shared Channel (SL-SCH) subheader is used. In this version of the specification two format versions are defined, and this field shall therefore be set to "0001" or "0010". The V field size is 4 bits. SRC: The Source Layer-2 ID field carries the identity of the source. It is set to the ProSe UE ID. The SRC field size is 24 bits. If the V field is set to "0001" this identifier is the groupcast identifier. If the V field is set to "0010" this identifier is a unicast identifier. DST: The DST field carries the 16 most significant bits of the Destination Layer-2 ID. The Destination Layer-2 ID is set to the ProSe Layer-2 Group ID or ProSe UE ID. If the V field is set to "0001" this identifier is the groupcast identifier. If the V field is set to "0010" this identifier is the unicast identifier.

Figure 2:
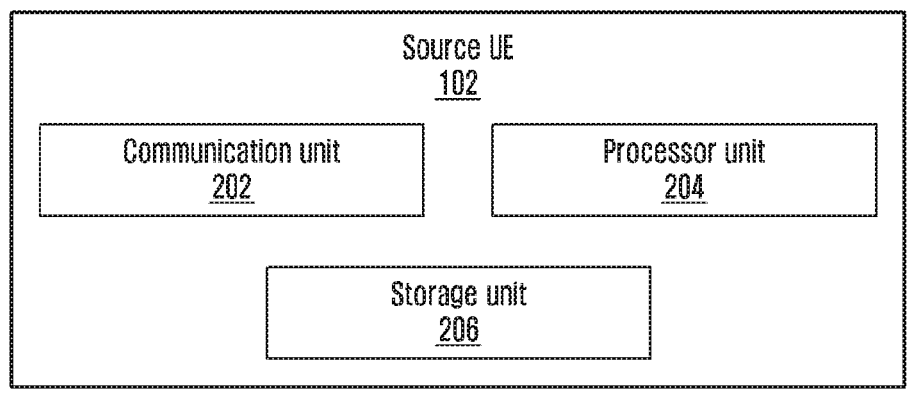
FIG. 2 is a block diagram illustrating various units of a source User Equipment (UE), according to an embodiment as disclosed herein.

FIG. 2 is a block diagram illustrating various units of a source User Equipment (UE) 102, according to an embodiment as disclosed herein. In an embodiment, the source UE 102 includes a communication unit 202, a processor unit 204, and a storage unit 206. The source UE 102 can be, for example, a cellular phone, a smart phone, a session initiation protocol (SIP) phone, a satellite radio, a laptop, a personal digital assistant (PDA), a video device, a global positioning system, a game console, a multimedia device, a tablet, or any other similar functioning device. The source UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or the like. The communication unit 202 is provided with the processor unit 204. The processor unit 204 is configured to set a D2D MAC PDU format version number in the MAC header of the D2D MAC PDU wherein the D2D MAC PDU format version number is set to different value for unicast and groupcast D2D communication. In an example, the 4 bits D2D MAC PDU format version number is set to '0010' (i.e., decimal value 2) in the MAC header of the D2D MAC PDU for the unicast D2D communication and the 4 bits D2D MAC PDU format version number is set to '0001' (i.e., decimal value 1) in the MAC header of the D2D MAC PDU for the groupcast D2D communication.

In an embodiment, for the unicast D2D communication, the processor unit 204 is configured to set DST field in the MAC header of D2D MAC PDU to 16 MSBs of D2D UE ID of a destination UE (not shown). In another embodiment, the processor unit 204 is configured to set DST field in the MAC header of the D2D MAC PDU to 24 MSBs of the D2D UE ID of the destination UE. In an embodiment, the processor unit 204 is configured to set 24 bit SRC field in the MAC header of the D2D MAC PDU to its D2D UE ID. In another embodiment, the processor unit 204 is configured to set 32 bit SRC field in the MAC header of the D2D MAC PDU to the its D2D UE ID. Further, the processor unit 204 is configured to set a unicast Packet Indicator (UPI) field in the MAC header of the D2D MAC PDU and set UPI field to one. Further, the processor unit 204 is configured to set the MAC sub-header(s) in the MAC header corresponding to the MAC SDU(s) in the D2D MAC PDU payload.

In an embodiment, for the groupcast D2D communication, the processor unit 204 is configured to set the DST field in the MAC header to 16 MSBs of the D2D Laye-2 Group ID of the destination UE. Further, the processor unit 204 is configured to set 24 bit SRC field in the MAC header to the D2D UE ID of the source UE 102. Further, the processor unit 204 is configured to set the MAC sub-header(s) in the MAC header corresponding to the MAC SDU(s) in the D2D MAC PDU payload.

Further, the processor unit 204 is configured to generate the D2D MAC PDU having the unicast parameter and groupcast parameter. After generating the D2D MAC PDU including the unicast parameter and groupcast parameter, the communication unit 202 is configured to transmit the D2D MAC PDU to the destination UE.

In an embodiment, the MAC PDU format version number field indicates which version of a Sidelink Shared Channel (SL-SCH) subheader is used. In this version of the specification two format versions are defined, and this field shall therefore be set to "0001" or "0010". The V field size is 4 bits. SRC: The Source Layer-2 ID field carries the identity of the source. It is set to the ProSe UE ID. The SRC field size is 24 bits. If the V field is set to "0001" this identifier is the groupcast identifier. If the V field is set to "0010" this identifier is a unicast identifier. DST: The DST field carries the 16 most significant bits of the Destination Layer-2 ID. The Destination Layer-2 ID is set to the ProSe Layer-2 Group ID or ProSe UE ID. If the V field is set to "0001" this identifier is the groupcast identifier. If the V field is set to "0010" this identifier is the unicast identifier.

The communication unit 202 is configured for communicating internally between internal units and with external devices via one or more networks. The storage unit 206 may include one or more computer-readable storage media. The storage unit 206 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage unit 206 may, in some examples, be considered a non-transitory storage medium. The term "non-transitory" may indicate that the storage medium is not embodied in a carrier wave or a propagated signal. However, the term "non-transitory" should not be interpreted that the storage unit 206 is non-movable. In some examples, the storage unit 206 can be configured to store larger amounts of information than a memory. In certain examples, a non-transitory storage medium may store data that can, over time, change (e.g., in Random Access Memory (RAM) or cache).

Although the FIG. 2 shows exemplary units of the source UE102 but it is to be understood that other embodiments are not limited thereon. In other embodiments, the source UE102 may include less or more number of units. Further, the labels or names of the units are used only for illustrative purpose and does not limit the scope of the invention. One or more units can be combined together to perform same or substantially similar function to generate and transmit the unicast parameter and the groupcast parameter from the source UE 102.

Figure 3:
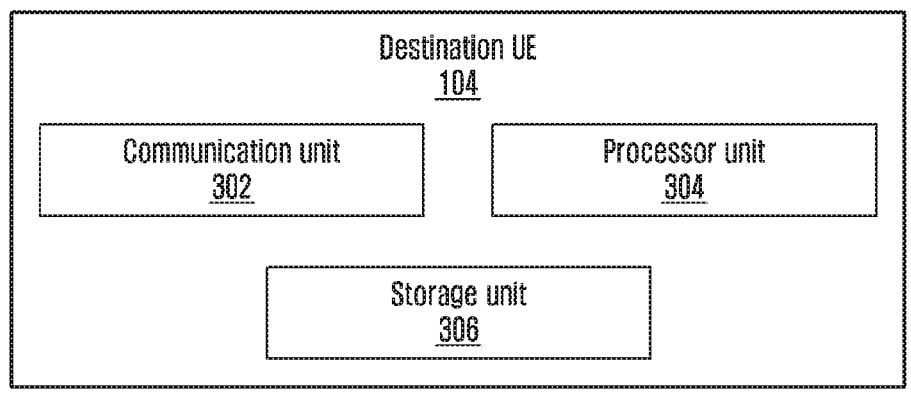
FIG. 3 is a block diagram illustrating various units of a destination UE, according to an embodiment as disclosed herein.

FIG. 3 illustrates various units of the destination UE 104, according to an embodiment as disclosed herein. In an embodiment, the destination UE 104 includes a communication unit 302, a processor unit 304, and a storage unit 306. The operation and functionality of the destination UE 104 is similar to the source UE 102. In an embodiment, the communication unit 302 is configured to receive the D2D MAC PDU. After receiving the D2D MAC PDU, the processor unit 304 is configured to detect whether the D2D MAC PDU includes one of the unicast parameters and the groupcast parameters. In response to detection, the processor unit 304 is configured to identify the D2D MAC PDU corresponding to the unicast D2D communication when the unicast parameters are detected. In response to detection, the processor unit 304 is configured to identify the D2D MAC PDU corresponding to the groupcast D2D communication when the groupcast parameters are detected.

In an embodiment, the unicast parameter can be, for example but not limited to, a unicast D2D MAC PDU format version number, a unicast packet indicator, a scrambled Cyclic Redundancy Check (CRC) of a Scheduling Assignment (SA), a number of bits, values, size associated with at least one of an identifier of the source UE 102, a group identifier of the source UE 102, an identifier of the destination UE 104 or the like.

In an embodiment, the D2D MAC PDU, for the unicast D2D communication, includes the unicast D2D MAC PDU format version, reserved bits, the identifier of the source UE 102, a unicast identifier of the destination UE 102, MAC sub-headers, and a unicast MAC Service Data Unit (SDU).

In an embodiment, the D2D MAC PDU, for the unicast D2D communication, includes the unicast D2D MAC PDU format version, reserved bits having a unicast Packet Indicator (UPI), an identifier of the source UE 102, the unicast identifier of the destination UE 104, the MAC sub-headers, and the unicast MAC SDU.

In an embodiment, the D2D MAC PDU, for the unicast D2D communication across groups, includes at least one of the unicast D2D MAC PDU format version, the reserved bits, the identifier of the source UE 102, the group identifier of the source UE 102, the unicast identifier of the destination UE 104, the group identifier of the destination UE 104, the MAC sub-headers, and the unicast MAC SDU.

In an embodiment, the D2D MAC PDU, for the unicast D2D communication within a group, includes at least one of a unicast D2D MAC PDU format version, the reserved bits, the identifier of the source UE 102, the unicast identifier of the destination UE 104, the group identifier of the destination UE 104, the MAC sub-headers, and the unicast MAC SDU.

In an embodiment, the D2D MAC PDU, for the unicast D2D communication for one of within the group and across the groups, includes at least one of the unicast D2D MAC PDU format version, the reserved bits including the group identifier, the identifier of the source UE 102, the unicast identifier of the destination UE 104, the group identifier of the destination UE 104, the MAC sub-headers, and the unicast MAC SDU.

In an embodiment, the processor unit 304 is configured to identify the D2D MAC PDU corresponding to the groupcast D2D communication when the groupcast parameters are detected.

In an embodiment, the groupcast parameter can be, for example but not limited to, a groupcast D2D MAC PDU format version, an unscrambled CRC of the SA, the number of bits, values, size associated with at least one of an identifier of the source UE 102, a group identifier of the source UE 102, an identifier of the destination UE 104 or the like.

In an embodiment, the D2D MAC PDU, for the groupcast D2D communication, includes at least one of a groupcast D2D MAC PDU format version, the reserved bits, the identifier of the source UE 102, the group identifier of the source UE 102, the identifier of the destination UE 104, a groupcast identifier of the destination UE 104, the MAC sub-headers, and a groupcast MAC SDU.

Although the FIG. 3 shows exemplary units of the destination UE104 but it is to be understood that other embodiments are not limited thereon. In other embodiments, the destination UE104 may include less or more number of units. Further, the labels or names of the units are used only for illustrative purpose and does not limit the scope of the invention. One or more units can be combined together to perform same or substantially similar function to discriminate between the unicast D2D communication and the groupcast D2D communication at the destination UE 104.

Figure 4A:
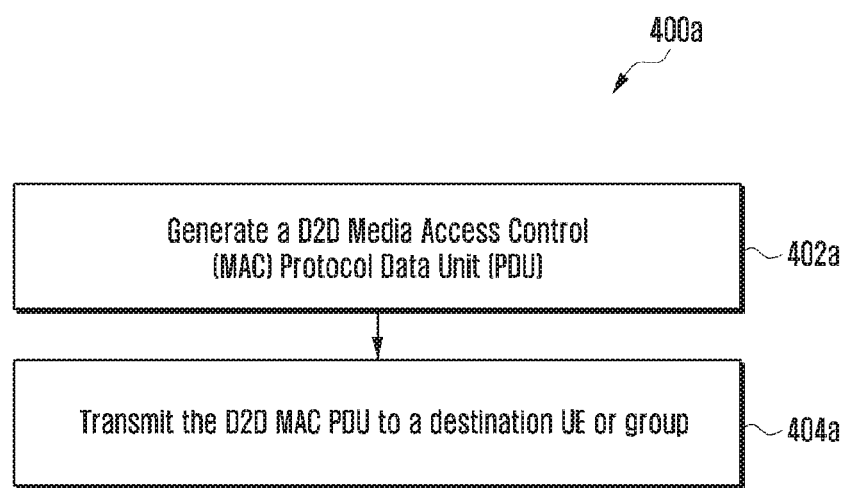
FIG. 4a is a flow diagram illustrating a method for generating and transmitting a D2D Media Access Control (MAC) Protocol Data Unit (PDU) at a source UE, according to an embodiment as disclosed herein.

FIG. 4a is a flow diagram illustrating a method 400a for generating and transmitting the D2D MAC PDU at the source UE 102, according to an embodiment as disclosed herein. At step 402a, the method 400a includes generating the D2D MAC PDU including one of unicast parameters and the groupcast parameters. In an embodiment, the method 400 allows the processor unit 204 to generate the D2D MAC PDU including one of unicast parameters and the groupcast parameters. At step 404a, the method 400a includes sending the D2D MAC PDU to the destination (i.e. destination UE 104 in case of unicast D2D communication or destination group in case of groupcast D2D communication). In an embodiment, the method 400a allows the communication unit 202 to transmit the D2D MAC PDU to the destination (i.e. destination UE 104 in case of unicast D2D communication or destination group in case of groupcast D2D communication).

In an example, the MAC PDU format version number field indicates which version of a Sidelink Shared Channel (SL-SCH) subheader is used. In this version of the specification two format versions are defined, and this field shall therefore be set to "0001" or "0010". The V field size is 4 bits. SRC: The Source Layer-2 ID field carries the identity of the source. It is set to the ProSe UE ID. The SRC field size is 24 bits. If the V field is set to "0001" this identifier is the groupcast identifier. If the V field is set to "0010" this identifier is a unicast identifier. DST: The DST field carries the 16 most significant bits of the Destination Layer-2 ID. The Destination Layer-2 ID is set to the ProSe Layer-2 Group ID or ProSe UE ID. If the V field is set to "0001" this identifier is the groupcast identifier. If the V field is set to "0010" this identifier is the unicast identifier.

The various actions, acts, blocks, steps, or the like in the method 400a may be performed in the order presented, in a different order or simultaneously. Further, in some embodiments, some of the actions, acts, blocks, steps, or the like may be omitted, added, modified, skipped, or the like without departing from the scope of the invention.

Figure 4B:
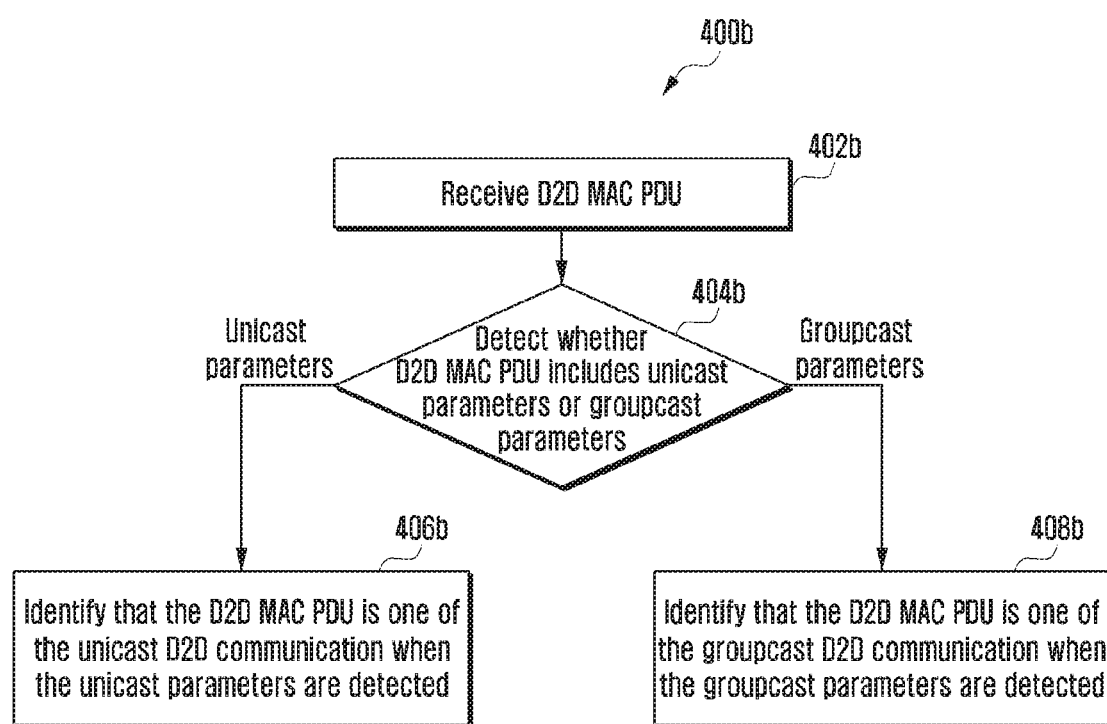
FIG. 4b is a flow diagram illustrating a method for discriminating between a unicast D2D communication and a groupcast D2D communication at a destination UE, according to an embodiment as disclosed herein.

FIG. 4b is a flow diagram illustrating a method 400b for discriminating between the unicast D2D communication and the groupcast D2D communication at the destination UE 104, according to an embodiment as disclosed herein. At step 402b, the method 400b includes receiving the D2D MAC PDU. In an embodiment, the method 400b allows the communication unit 302 to receive the D2D MAC PDU. At step 404b, the method 400b includes detecting whether D2D MAC PDU includes one of unicast parameters and groupcast parameters. In an embodiment, the method 400b allows the processor unit 304 to detect whether D2D MAC PDU includes one of unicast parameters and groupcast parameters. At step 406b, the method 400b includes identifying that the D2D MAC PDU is one of the unicast D2D communication when the unicast parameters are detected. In an embodiment, the method 400b allows the processor unit 304 to identify that the D2D MAC PDU is one of the unicast D2D communication when the unicast parameters are detected. At step 408b, the method 400b includes identifying that the D2D MAC PDU is one of the groupcast D2D communication when the groupcast parameters are detected. In an embodiment, the method 400b allows the processor unit 304 to identify that the D2D MAC PDU is one of the groupcast D2D communication when the groupcast parameters are detected.

The various actions, acts, blocks, steps, or the like in the method 400b may be performed in the order presented, in a different order or simultaneously. Further, in some embodiments, some of the actions, acts, blocks, steps, or the like may be omitted, added, modified, skipped, or the like without departing from the scope of the invention.

Figure 5A:
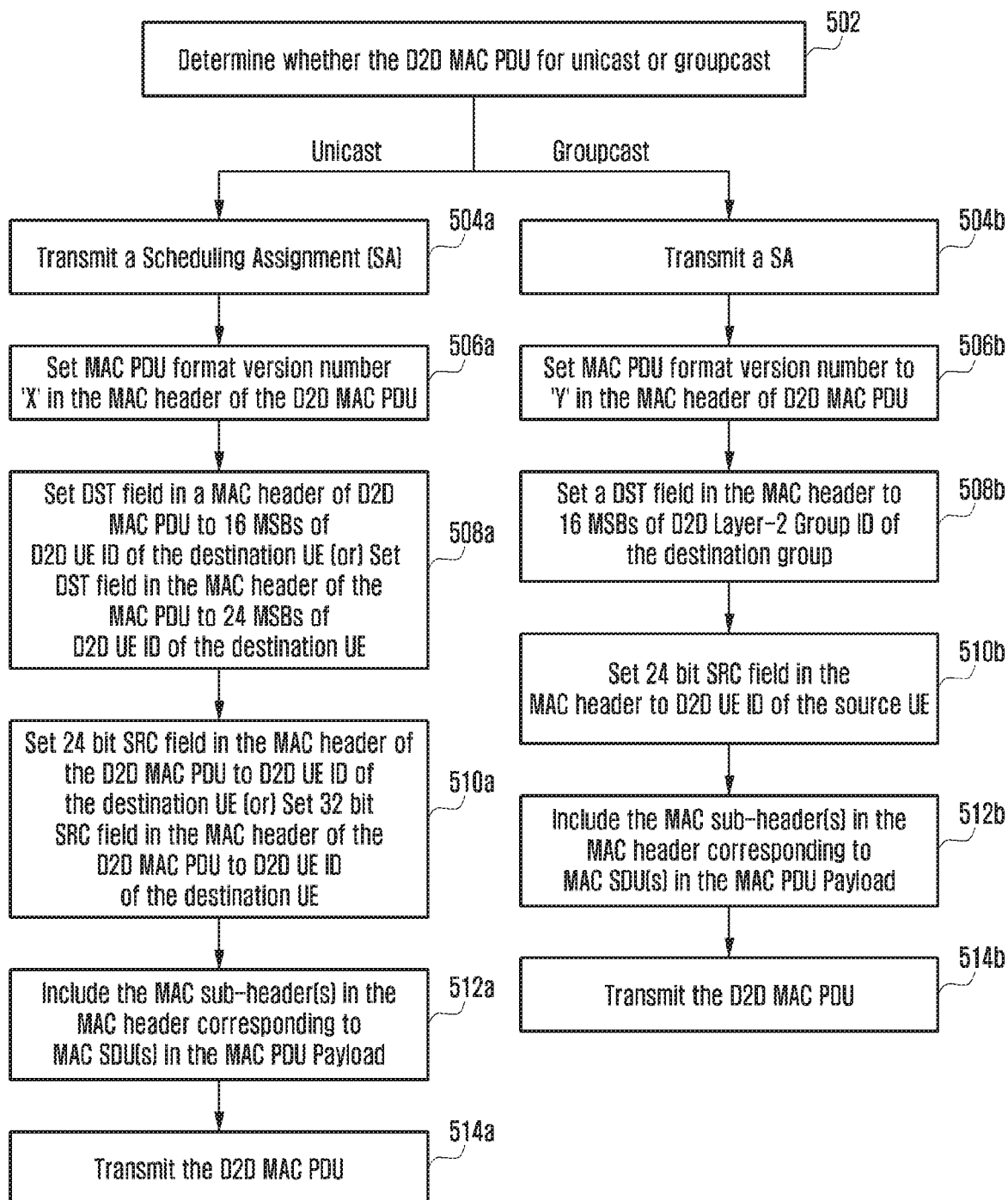
FIG. 5a is a flow diagram illustrating source UE operations for D2D MAC PDU generation and transmission which includes one of unicast parameters and groupcast parameters, according to an embodiment as disclosed herein.

FIG. 5a is a flow diagram illustrating source UE operations for the D2D MAC PDU generation and transmission which includes one of unicast parameters and groupcast parameters, according to an embodiment as disclosed herein. At 502, the source UE 102 is configured to determine whether the MAC SDU(s) to be transmitted in D2D MAC PDU is for the unicast D2D communication or the groupcast D2D communication. If the MAC SDU(s) to be transmitted in D2D MAC PDU is for the unicast D2D communication, at 504a, the source UE 102 is configured to transmit the SA. In an embodiment, the L1 ID in the SA/SC is set to 8 LSBs of D2D UE ID of the destination UE 104. At 506a, the source UE 102 is configured to set the D2D MAC PDU format version field to 'X' in the MAC header of the D2D MAC PDU. In an example, the 4 bits D2D MAC PDU format version number field is set to '0010' (i.e. decimal value 2) in the MAC header of the D2D MAC PDU.

At 508a, the source UE 102 is configured to set the DST field in the MAC header of the D2D MAC PDU to 16 MSBs of the D2D UE ID of the destination UE 104. Alternatively, at 508a, the source UE 102 is configured to set the DST field in the MAC header of the D2D MAC PDU to 24 MSBs of D2D UE ID of the destination UE 104. The D2D UE ID set in DST field is the unicast identifier of destination UE. At 510a, the source UE 102 is configured to set 24 bit SRC field in the MAC header of the D2D MAC PDU to the D2D UE ID of the source UE 102 wherein the length of D2D UE ID of source UE 102 is 24 bits. Alternatively, at 510a, the source UE 102 is configured to set 32 bit SRC field in the MAC header of the D2D MAC PDU to the D2D UE ID of the source UE 102 wherein the length of D2D UE ID of source UE 102 is 32 bits. The D2D UE ID set in SRC field is the unicast identifier of the source UE 102 and identifies the source UE 102. At 512a, the source UE 102 is configured to include the MAC sub-header(s) in the MAC header corresponding to MAC SDU(s) in the D2D MAC PDU payload. At 514a, the source UE 102 is configured to transmit the D2D MAC PDU.

If the MAC SDU(s) to be transmitted in D2D MAC PDU is for the groupcast D2D communication, at 504b, the source UE 102 is configured to transmit the SA. The L1 ID field in the SA/SC is set to 8 LSBs of the D2D layer-2 group ID of the destination group. At 506b, the source UE 102 is configured set the D2D MAC PDU format version number field to 'Y' in the MAC header. In an example, the 4 bits D2D MAC PDU format version number is set to 0001 (i.e., decimal value 1) in the MAC header of the D2D MAC PDU. At 508b, the source UE 102 is configured set the DST field in the MAC header to 16 MSBs of D2D Layer-2 Group ID of the destination group. At 510b, the source UE 102 is configured set the 24 bit SRC field in the MAC header to the D2D UE ID of the source UE 102. At 512b, the source UE 102 is configured to include the MAC sub-header(s) in the MAC header corresponding to the MAC SDU(s) in the D2D MAC PDU payload. At 514b, the source UE 102 is configured transmit the D2D MAC PDU.

The various actions, acts, blocks, steps, or the like in the source UE operations may be performed in the order presented, in a different order or simultaneously. Further, in some embodiments, some of the actions, acts, blocks, steps, or the like may be omitted, added, modified, skipped, or the like without departing from the scope of the invention.

Figure 5B:
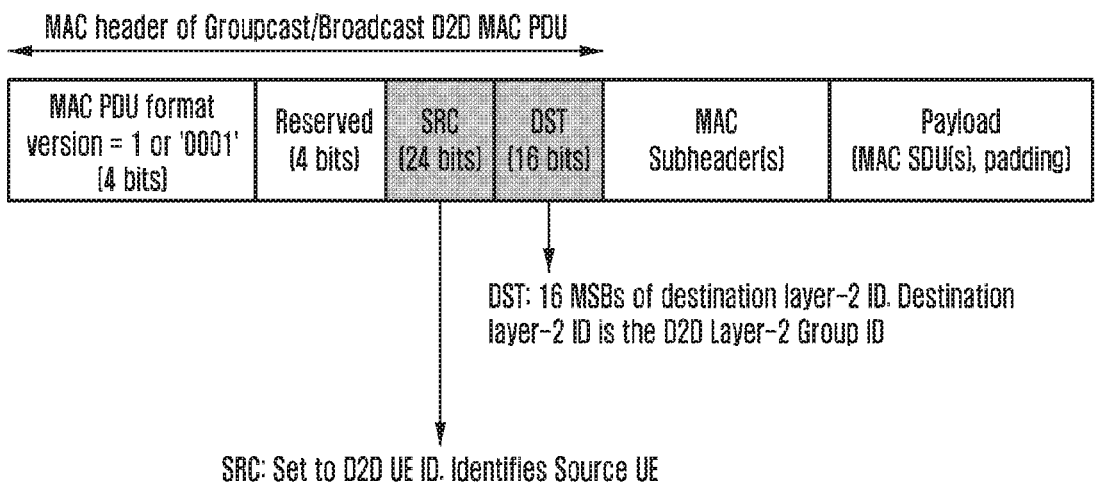
FIG. 5b to FIG. 5d illustrate an example of a D2D MAC PDU format as described in the FIG. 5a, according to an embodiment as disclosed herein.
Figure 5C:
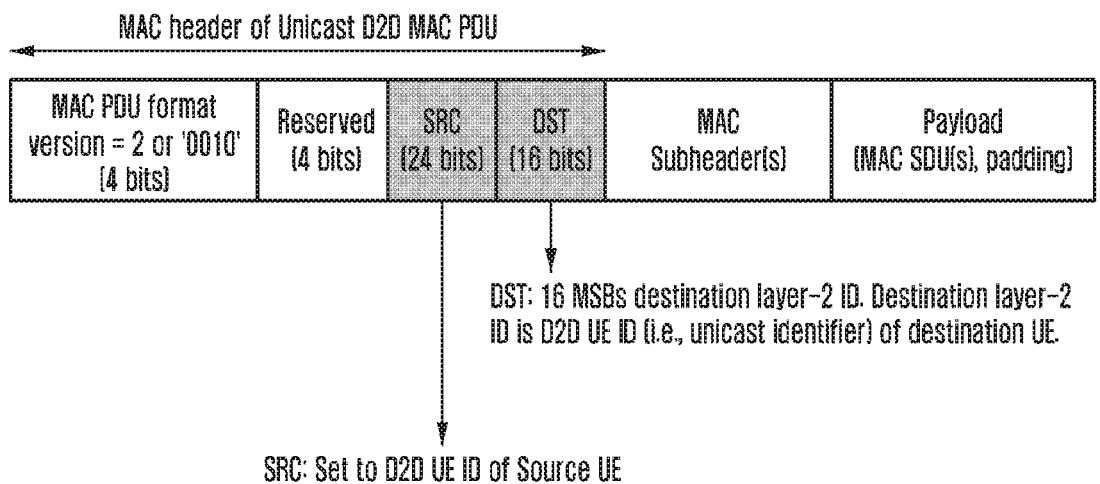
Figure 5D:
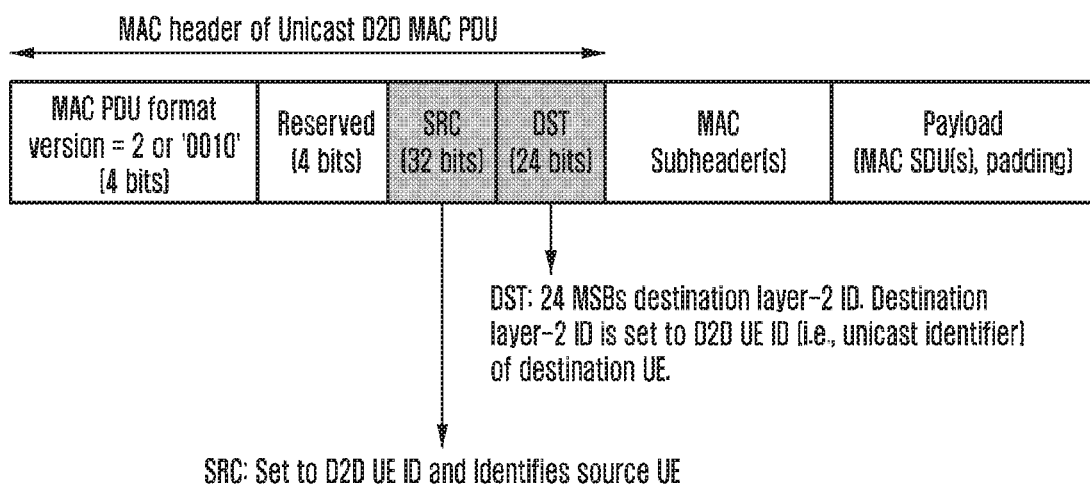

FIG. 5b to FIG. 5d illustrates an example of the D2D MAC PDU format as described in the FIG. 5a, according to an embodiment as disclosed herein. Consider, the source UE 102 is assigned separate D2D UE ID for the unicast D2D communication and the groupcast D2D communication. The values for the D2D UE ID and D2D Layer 2 Group ID are 24 bits values and assigned from same address space independently. There is no partition of address space between the unicast ID (i.e. D2D UE ID) and the group ID (i.e. D2D Layer 2 group ID). In an embodiment, the D2D UE ID for the unicast D2D communication is assigned by a D2D server. The D2D UE ID and the D2D Layer 2 group ID for the group communication are assigned by a D2D key management function.

In an embodiment, the D2D UE ID for the unicast D2D communication is selected by the source UE itself. The D2D UE ID and the D2D Layer 2 group ID for the group communication are assigned by the D2D key management function.

In an embodiment, the D2D MAC PDU format version number in the MAC header is used to distinguish between the D2D MAC PDU carrying the unicast and groupcast MAC SDUs. Whether the D2D MAC PDU carries unicast or groupcast MAC SDUs is indicated using distinct values of D2D MAC PDU format version number. The SRC/DST fields of the MAC header are set to unicast or groupcast IDs according to the D2D MAC PDU format version number.

In an embodiment, the MAC layer protocol in a communication unit 202 first determines whether the MAC SDU(s) to be transmitted in the D2D MAC PDU is for the unicast D2D communication or the groupcast D2D communication. The MAC layer protocol receives information from upper layers (e.g. Radio Link Control (RLC) layer) along with the MAC SDU (i.e., RLC PDU) indicating whether the MAC SDU is for the unicast D2D communication or the groupcast D2D communication. If the MAC SDU(s) is for the unicast D2D communication then, the MAC layer generates the D2D MAC PDU as follows.

The 4 bits D2D MAC PDU format version number is included in the MAC header and is set to 'X' (e.g. 0010 in binary or 2 in decimal) in the MAC header of the D2D MAC PDU. Note that the D2D MAC PDU format version number in the MAC header is distinct for the unicast D2D MAC PDU and the groupcast D2D MAC PDU. In an embodiment, if the scrambled CRC is used for the SA information corresponding to the unicast D2D MAC PDU then 4 bits of the D2D MAC PDU format version number may be set same for both unicast and groupcast D2D MAC PDU.

The 4 reserved bits following the D2D MAC PDU format version number is set to zeros.

The 24 bits SRC field is included in the MAC header. In an embodiment, the 24 bits SRC field in the MAC header of D2D MAC PDU is set to the D2D UE ID of the source UE 102 where the length of D2D UE ID of the source UE is 24 bits as shown in the FIG. 5c. In an embodiment, 32 bits SRC field is included in the MAC header as shown in the FIG. 5d. The 32 bits SRC field in the MAC header of the D2D MAC PDU is set to the D2D UE ID of the source UE 102, where the length of the D2D UE ID of the source UE 102 is 32 bits. The D2D UE ID encoded in the SRC field is the unicast identifier of the source UE 102 and identifies the source UE 102.

The 16 bit DST field is also included in the MAC header as shown in the FIG. 5c. In an embodiment, the 16 bits DST field in the MAC header of D2D MAC PDU is set to 16 MSBs of the D2D UE ID of the destination UE 104. In an embodiment, 24 bit DST field is included in the MAC header as shown in the FIG. 5d. The 24 bits DST field in the MAC header of D2D MAC PDU is set to 24 MSBs of D2D UE ID of the destination UE 104. The D2D UE ID encoded in the DST field is the unicast identifier of the destination UE 104.

The MAC subheader(s) in the MAC header corresponding to the MAC SDU(s) and/or padding is then included in the D2D MAC PDU payload.

The SA or scheduling control (SC) including the L1 ID field set to 8 LSBs of destination ProSe UE ID and CRC bits is transmitted prior to transmission of unicast D2D MAC PDU.

In an embodiment, the SA or SC including the L1 ID field set to 8 LSBs of destination D2D UE ID and with scrambled CRC bits is transmitted prior to transmission of the D2D MAC PDU. The SA is protected using the CRC. The SA information is used to calculate a set of CRC parity bits. The scheduling information bits are divided by a CRC generator polynomial to generate 16 CRC parity bits. The CRC parity bits are then scrambled using a pre-defined CRC mask. The scrambled CRC is obtained by performing a bit-wise XOR operation of the 16 bit calculated CRC parity bits and bits of pre-defined CRC mask.

The proposed technique indicates whether the D2D MAC PDU carries the unicast or groupcast MAC SDUs using distinct values of the D2D MAC PDU format version number. The proposed technique can be used to encode or decode the different values and sizes in the SRC/DST fields of the MAC Header depending on whether the D2D MAC PDU carries unicast or groupcast MAC SDUs. The proposed technique indicates whether the D2D MAC PDU carries the unicast or groupcast MAC SDUs using the scrambled and unscrambled CRC of the SA (i.e., scrambled CRC using a predefined CRC mask for the SA corresponding to the unicast D2D MAC PDU and unscrambled CRC for the SA corresponding to a non-unicast D2D MAC PDU).

Figure 5E:
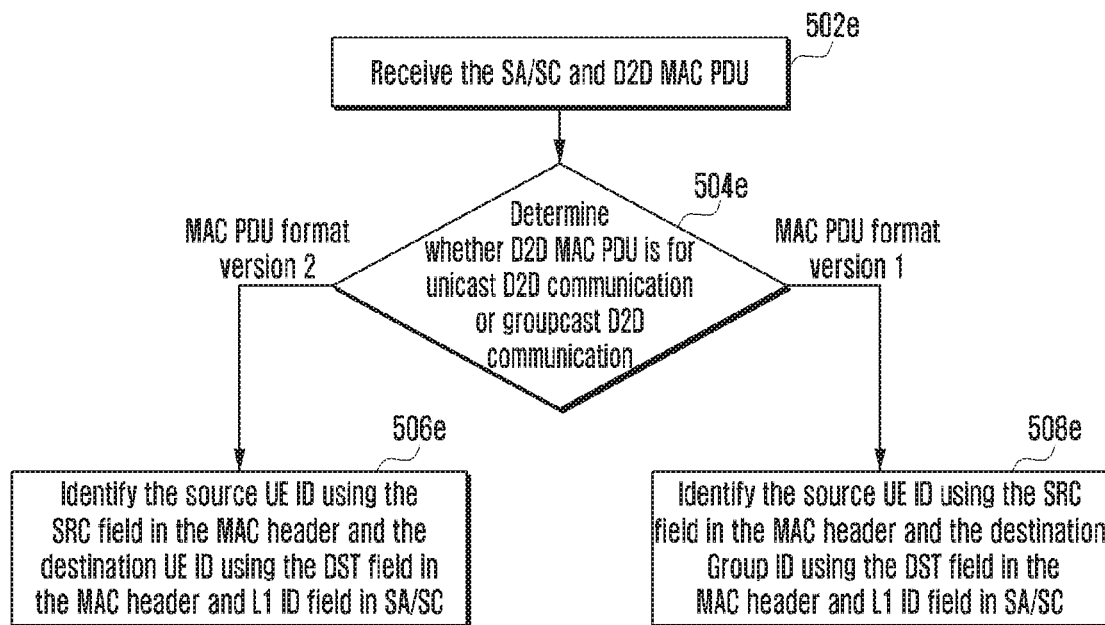
FIG. 5e is a flow diagram illustrating destination UE operations for discriminating between a unicast D2D communication and a groupcast D2D communication based on a D2D MAC PDU format version, according to an embodiment as disclosed herein.

FIG. 5e is a flow diagram illustrating destination UE operations for discriminating between the unicast D2D communication and the groupcast D2D communication based on the D2D MAC PDU format version number, according to an embodiment as disclosed herein. At 502e, the destination UE 104 is configured to receive the SA/SC and D2D MAC PDU. At 504e, the destination UE 104 is configured to determine whether the D2D MAC PDU is for the unicast D2D communication or groupcast D2D communication based on the D2D MAC PDU format version number in the MAC header of D2D MAC PDU.

If the D2D MAC PDU is for the unicast D2D communication, at 506e, the destination UE 104 is configured to identify the source UE ID using the SRC field in the MAC header and the destination UE ID using the DST field in the MAC header and L1 ID field in the SA/SC. If the D2D MAC PDU is for the groupcast D2D communication, at 508e, the destination UE 104 is configured to identify the source UE ID using the SRC field in the MAC header and the destination Group ID using the DST field in the MAC header and L1 ID field in SA/SC.

The various actions, acts, blocks, steps, or the like in the destination UE operation may be performed in the order presented, in a different order or simultaneously. Further, in some embodiments, some of the actions, acts, blocks, steps, or the like may be omitted, added, modified, skipped, or the like without departing from the scope of the invention.

Figure 5F:
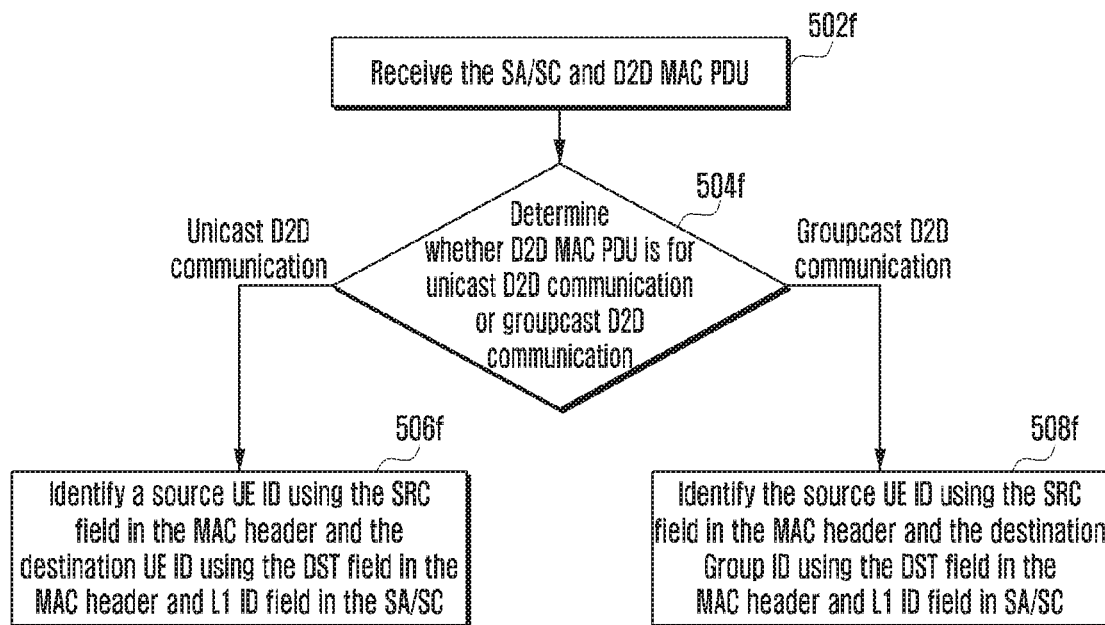
FIG. 5f is a flow diagram illustrating destination UE operations for discriminating between a unicast D2D communication and a groupcast D2D communication based on a Cyclic Redundancy Check (CRC) of Scheduling Assignment (SA)/Scheduling Control (SC), according to an embodiment as disclosed herein.

FIG. 5*f* is a flow diagram illustrating destination UE operations for discriminating between the unicast D2D communication and the groupcast D2D communication based on the CRC of SA/SC, according to an embodiment as disclosed herein. At 502*f*, the destination UE 104 is configured to receive the SA/SC and D2D MAC PDU. At 504*f*, the destination UE 104 is configured to determine whether the D2D MAC PDU is for the unicast D2D communication or groupcast D2D communication based on the CRC of SA/SC. If the CRC is scrambled using the pre-defined CRC mask then D2D MAC PDU is for the unicast D2D communication otherwise D2D MAC PDU is for the groupcast D2D communication.

If the D2D MAC PDU is for the unicast D2D communication, at 506*f*, the destination UE 104 is configured to identify the source UE ID using the SRC field in the MAC header and the destination UE ID using the DST field in the MAC header and L1 ID field in the SA/SC. If the D2D MAC PDU is for the groupcast D2D communication, at 508*f*, the destination UE 104 is configured to identify the source UE ID using the SRC field in the MAC header and the destination Group ID using the DST field in the MAC header and L1 ID field in SA/SC.

The various actions, acts, blocks, steps, or the like in the destination UE operation may be performed in the order presented, in a different order or simultaneously. Further, in some embodiments, some of the actions, acts, blocks, steps, or the like may be omitted, added, modified, skipped, or the like without departing from the scope of the invention.

Figure 6A:
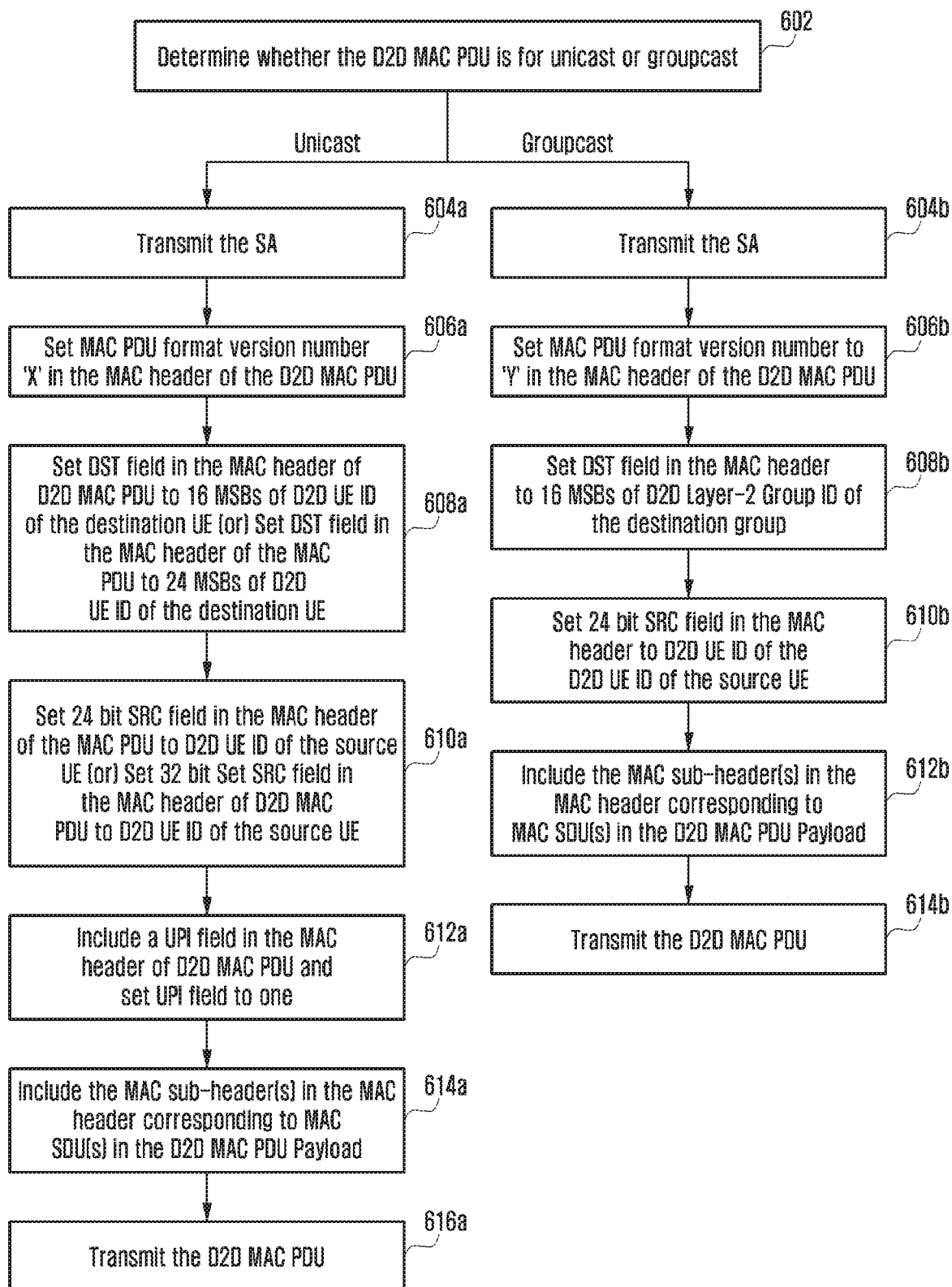
FIG. 6a is a flow diagram illustrating source UE operations for D2D MAC PDU generation and transmission which includes an unicast packet indicator, according to an embodiment as disclosed herein.

FIG. 6*a* is a flow diagram illustrating source UE operations for D2D MAC PDU generation and transmission which includes the unicast Packet Indicator (UPI), according to an embodiment as disclosed herein. At 602, the source UE 102 is configured to determine whether the D2D MAC PDU is for the unicast D2D communication or the groupcast D2D communication. If the D2D MAC PDU is for the unicast D2D communication, at 604*a*, the source UE 102 is configured to transmit the SA. In an embodiment, the L1 ID in the SA/SC is set to 8 LSBs of D2D UE ID of the destination UE 104. At 606*a*, the source UE 102 is configured to set the D2D MAC PDU format version number field to 'X' in the MAC header of the D2D MAC PDU. In an example, the 4 bits D2D MAC PDU format version number is set to 0010 (i.e., decimal value 2) in the MAC header of the D2D MAC PDU. At 608*a*, the source UE 102 is configured to set the DST field in the MAC header of the D2D MAC PDU to 16 MSBs of the D2D UE ID of the destination UE 104. Alternatively, at 608*a*, the source UE 102 is configured to set the DST field in the MAC header of the D2D MAC PDU to 24 MSBs of D2D UE ID of the destination UE 104.

At 610*a*, the source UE 102 is configured to set 24 bit SRC field in the MAC header of the D2D MAC PDU to the D2D UE ID of the source UE 102 wherein the length of D2D UE ID of source UE 102 is 24 bits. Alternatively, at 610*a*, the source UE 102 is configured to set 32 bit SRC field in the MAC header of the D2D MAC PDU to the D2D UE ID of the source UE 102 wherein the length of D2D UE ID of source UE 102 is 32 bits. At 612*a*, the source UE 102 is configured to include the UPI field in the MAC header of the D2D MAC PDU and set the UPI field to one. At 614*a*, the source UE 102 is configured to set the MAC sub-header(s) in the MAC header corresponding to the MAC SDU(s) in the D2D MAC PDU payload. At 616*a*, the source UE 102 is configured to transmit the D2D MAC PDU.

If the D2D MAC PDU is for the groupcast D2D communication, at 604*b*, the source UE 102 is configured to transmit the SA. The L1 ID field in the SA/SC is set to 8 LSBs of the D2D layer-2 group ID of the destination group. At 606*b*, the source UE 102 is configured to set the D2D MAC PDU format version number to 'Y' in the MAC header. In an example, the 4 bits D2D MAC PDU format version number is set to 0001 (i.e., decimal value 1) in the MAC header of the D2D MAC PDU. At 608*b*, the source UE 102 is configured to set the DST field in the MAC header to 16 MSBs of D2D Laye-2 Group ID of the destination UE 104. At 610*b*, the source UE 102 is configured to set the 24 bit SRC field in the MAC header to the D2D UE ID of the source UE 102. At 612*b*, the source UE 102 is configured to provide the MAC sub-header(s) in the MAC header corresponding to the MAC SDU(s) in the D2D MAC PDU payload. At 614*b*, the source UE 102 is configured to transmit the D2D MAC PDU.

The various actions, acts, blocks, steps, or the like in the source UE operations may be performed in the order presented, in a different order or simultaneously. Further, in some embodiments, some of the actions, acts, blocks, steps, or the like may be omitted, added, modified, skipped, or the like without departing from the scope of the invention.

Figure 6B:
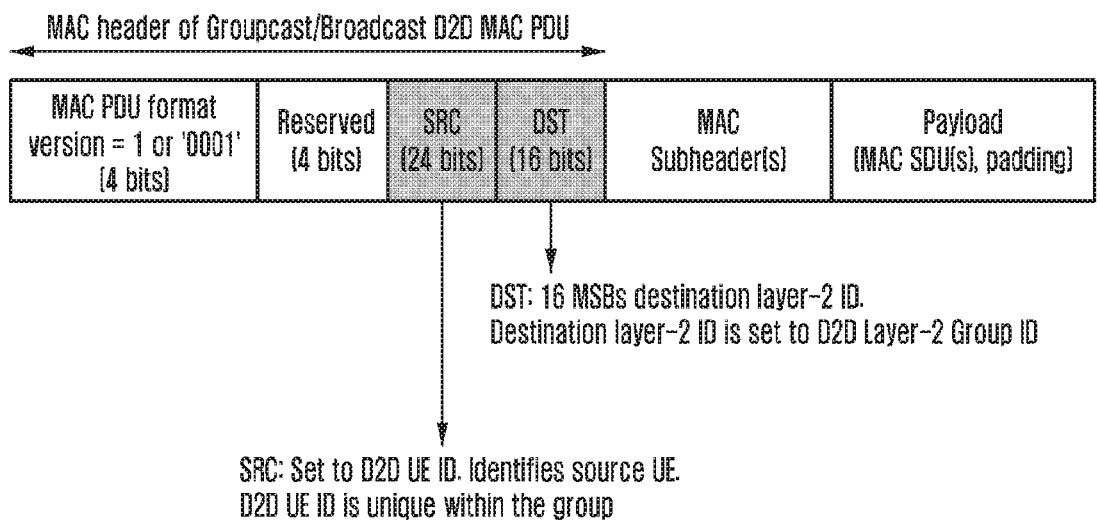
FIG. 6b to FIG. 6d illustrate an example of a D2D MAC PDU format as described in the FIG. 6a, according to an embodiment as disclosed herein.
Figure 6C:
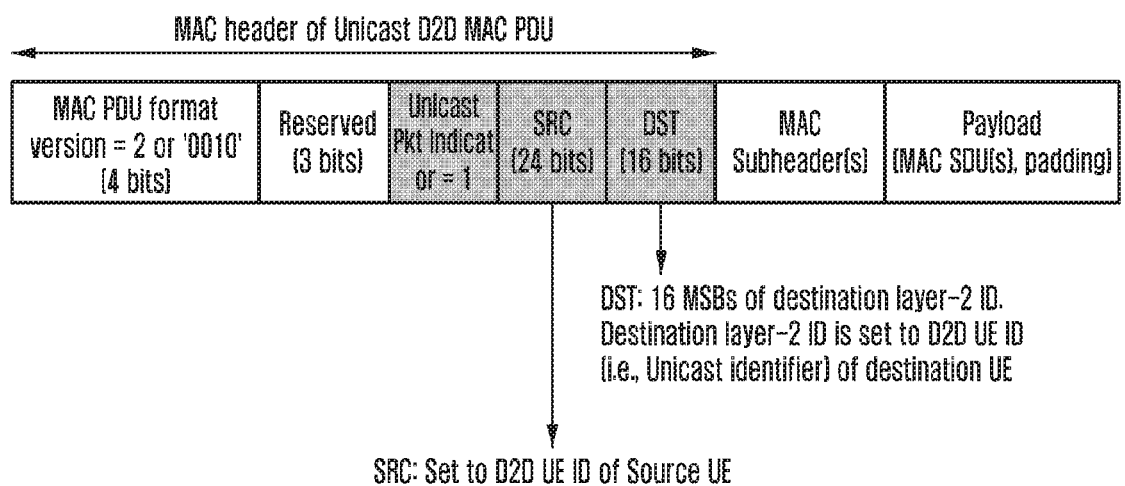
Figure 6D:
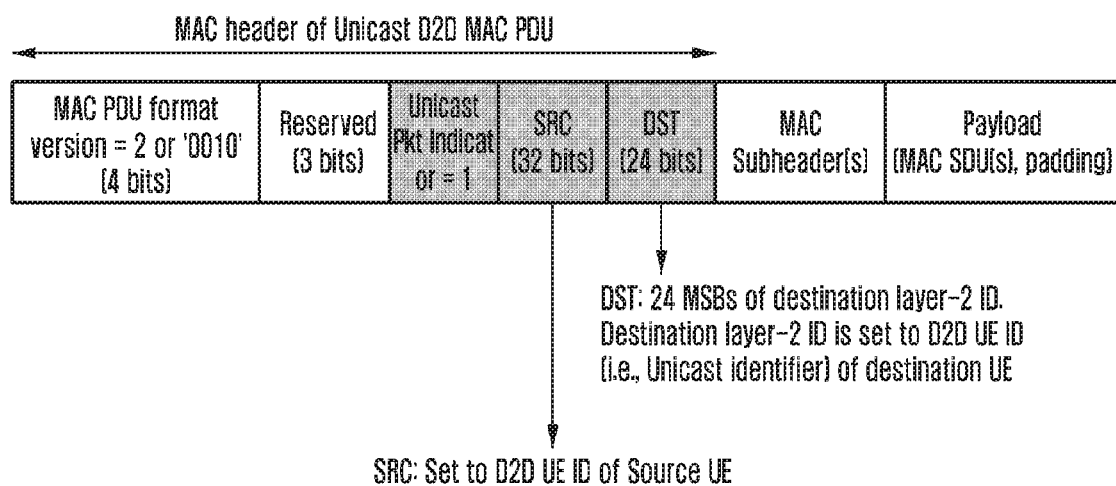

FIG. 6*b* to FIG. 6*d* illustrates an example of the D2D MAC PDU format as described in the FIG. 6*a*, according to an embodiment as disclosed herein. Consider, the MAC layer protocol in the transmitter unit 202 first determines whether the MAC SDU(s) to be transmitted in the D2D MAC PDU is for the unicast D2D communication or the groupcast D2D communication. The MAC layer protocol receives information from the upper layers (e.g. RLC layer) along with the MAC SDU (i.e. RLC PDU) indicating whether the MAC SDU is for the unicast D2D communication or the groupcast D2D communication. If the MAC SDU(s) is for the unicast D2D communication, then the MAC layer generates the D2D MAC PDU as follows.

The 4 bits D2D MAC PDU format version number is included in the MAC header and is set to 'X' (e.g. 0010 in binary or 2 in decimal) in the MAC header of the D2D MAC PDU. Note that the D2D MAC PDU format version number in the MAC header is distinct for the unicast D2D MAC PDU and the groupcast D2D MAC PDU. In an embodiment, if the scrambled CRC is used for the SA information corresponding to the unicast D2D MAC PDU then the 4 bits of the D2D MAC PDU format version number may be set same for both unicast and groupcast D2D MAC PDU.

The 3 reserved bits following the D2D MAC PDU format version number is set to zeros.

The UPI field is included in the MAC header and is set to '1' as shown in the FIG. 6*c* and FIG. 6*d*.

The 24 bits SRC field is included in the MAC header as shown in the FIG. 6*c*. The 24 bits SRC field in the MAC header of the D2D MAC PDU is set to D2D UE ID of the source UE 102, where the length of D2D UE ID of the source UE is 24 bits. In an embodiment, 32 bits SRC field is included in the MAC header as shown in the FIG. 6*d*. The 32 bits SRC field in the MAC header of the D2D MAC PDU is set to D2D UE ID of the source UE 102, where the length of D2D UE ID of the source UE 102 is 32 bits. The D2D UE ID encoded in the SRC field is the unicast identifier of the source UE 102 and identifies the source UE.

The 16 bit DST field is also included in the MAC header as shown in the FIG. 6*c*. The 16 bits DST field in the MAC header of the D2D MAC PDU is set to 16 MSBs of the D2D UE ID of the destination UE 104. In an embodiment, 24 bit DST field is included in the MAC header as shown in the FIG. 6*d*. The 24 bits DST field in the MAC header of the D2D MAC PDU is set to 24 MSBs of D2D UE ID of the destination UE 104. The D2D UE ID encoded in the DST field is the unicast identifier of the destination UE.

The MAC subheader(s) in the MAC header corresponding to MAC SDU(s) and/or padding is then included in the D2D MAC PDU payload.

The SA or SC including the L1 ID field set to 8 LSBs of Destination D2D UE ID and CRC bits are transmitted prior to transmission of the D2D MAC PDU.

In an embodiment, the SA or the SC including the L1 ID field set to 8 LSBs of destination D2D UE ID and with scrambled CRC bits is transmitted prior to transmission of the D2D MAC PDU. The SA is protected using the CRC. The SA information is used to calculate the set of CRC parity bits. The scheduling information bits are divided by the CRC generator polynomial to generate 16 CRC parity bits. The CRC parity bits are then scrambled using the pre-defined CRC mask. The scrambled CRC is obtained by performing a bit-wise XOR operation of the 16 bit calculated CRC parity bits and bits of pre-defined CRC mask.

The proposed technique can be used to indicate whether the D2D MAC PDU carries the unicast MAC SDUs using D2D MAC PDU format version number and UPI. The proposed technique can be used to indicate whether the D2D MAC PDU carries the unicast MAC SDUs using the unicast packet indicator and the scrambled CRC of the SA information (i.e., scrambled CRC using predefined CRC mask for the SA corresponding to the unicast D2D MAC PDU and the unscrambled CRC for the SA corresponding to the non-unicast D2D MAC PDU.

The proposed technique can be used to determine the presence of the unicast packet indicator field in the MAC header using the D2D MAC PDU format version number or the scrambled CRC of the SA. The proposed technique can be used to encode/decode the different values and sizes in the SRC/DST fields of the MAC header depending on whether the D2D MAC PDU carries unicast or groupcast MAC SDUs.

FIG. 6e is a flow diagram illustrating destination UE operations while discriminating the unicast D2D communication and the groupcast D2D communication using the UPI, according to an embodiment as disclosed herein. At 602e, the destination UE 104 is configured to receive the D2D MAC PDU. At 604e, the destination UE 104 is configured to detect whether the D2D MAC PDU includes the unicast parameters or the groupcast parameters. If the D2D MAC PDU includes the groupcast parameters, at 606e, the destination UE 104 is configured to read the SRC and DST fields in MAC header and identify the source UE ID using the SRC field in the MAC header and Destination Group ID using the DST field in MAC header and L1 ID field in SA/SC.

If the D2D MAC PDU corresponds to the unicast parameters, at 608e, the destination UE 104 is configured to determine whether the unicast packet indicator field corresponding to "zero" or "one". If the unicast packet indicator field corresponds to "one", at 610e, the destination UE 104 is configured to read the SRC and DST fields in MAC header and identify the source UE ID using the SRC field in the MAC header and Destination UE ID using the DST field in MAC header and L1 ID field in SA/SC. If the unicast packet indicator field corresponds to "zero", at 612e, the destination UE 104 is configured to indicate an error signal or perform the operation same manner as if the D2D MAC PDU format version number is '0001' (i.e. decimal value 1).

The various actions, acts, blocks, steps, or the like in the receiving unit operation may be performed in the order presented, in a different order or simultaneously. Further, in some embodiments, some of the actions, acts, blocks, steps, or the like may be omitted, added, modified, skipped, or the like without departing from the scope of the invention.

Figure 7A:
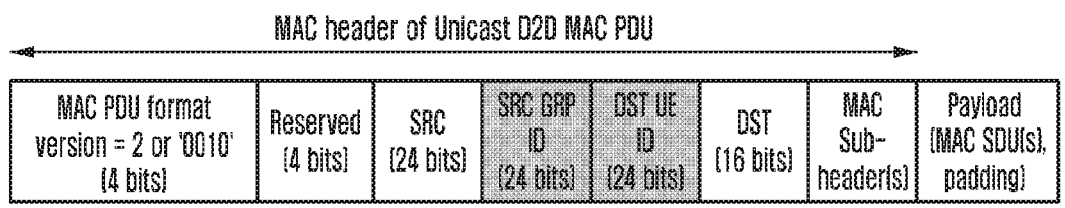
FIGS. 7a and 7b illustrate an example of a D2D MAC PDU format for unicast across groups, according to an embodiment as disclosed herein.
Figure 7B:
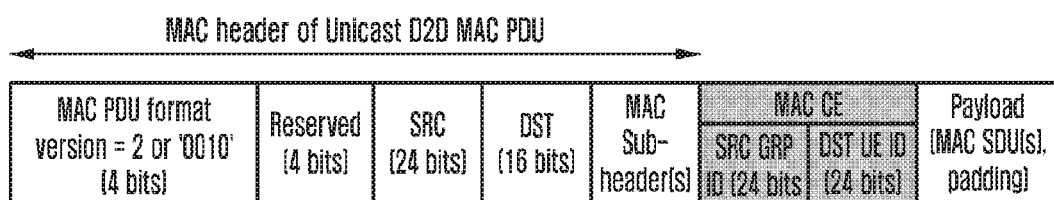

FIGS. 7a and 7b illustrates an example of the D2D MAC PDU format for unicast across groups, according to an embodiment as disclosed herein. Consider, the unicast D2D communication is established within the members of the group or within members of different groups. The MAC layer protocol in the communication unit 202 first determines whether the MAC SDU(s) to be transmitted in the D2D MAC PDU is for the unicast D2D communication or the groupcast D2D communication. The MAC layer protocol receives information from the upper layers (e.g. RLC layer) along with the MAC SDU (i.e. RLC PDU) indicating whether the MAC SDU is for the unicast D2D communication or the groupcast D2D communication. If the MAC SDU(s) is for the unicast D2D communication then, the MAC layer generates the D2D MAC PDU as follows.

The 4 bits D2D MAC PDU format version number is included in the MAC header and is set to 'X' (e.g. 0010 in binary or 2 in decimal representation) in the MAC header of the D2D MAC PDU. Note that the D2D MAC PDU format version number in the MAC header is distinct for the unicast D2D MAC PDU and the groupcast D2D MAC PDU. In an embodiment, if the scrambled CRC is used for the SA information corresponding to the unicast D2D MAC PDU then, 4 bits of D2D MAC PDU format version number may be set same for both unicast and groupcast D2D MAC PDU.

The 4 reserved bits following the D2D MAC PDU format version number is set to zeros.

The 24 bits SRC field is included in the MAC header. The 24 bits SRC field in the MAC header of the D2D MAC PDU is set to D2D UE ID of the source UE 102. The D2D UE ID encoded in the SRC field is the unicast identifier of the source UE 102.

The 24 bits SRC GRP ID field is included in the MAC header. The 24 bits SRC GRP ID field in the MAC header of the D2D MAC PDU is set to D2D Layer-2 Group ID of the source UE 102.

The 24 bits DST UE ID field is included in the MAC header. The 24 bits DST UE ID field in the MAC header of the D2D MAC PDU is set to the D2D UE ID of the destination UE. The D2D UE ID encoded in the DST UE field is the unicast address of the destination UE 104 of the group identified by D2D Layer-2 Group ID encoded in the DST field in the MAC header and the SA.

The 16 bit DST field is also included in the MAC header. The 16 bits DST field in the MAC header of the D2D MAC PDU is set to 16 MSBs of D2D Layer-2 group ID of the destination UE 104.

The MAC subheader(s) in the MAC header corresponding to MAC SDU(s) and/or padding is then included in the D2D MAC PDU payload.

In an embodiment, the SRC GRP ID and the DST UE ID are included in the MAC Control Element (CE) instead of the MAC header as shown in the FIG. 7b.

In an embodiment, the SA including the 8 LSBs of destination UE's D2D Layer-2 Group ID and the CRC bits is transmitted prior to transmission of the D2D MAC PDU. In an embodiment, the SA including the 8 LSBs of destination UE's D2D Layer-2 Group ID and with scrambled CRC bits is transmitted prior to transmission of the D2D MAC PDU. The SA is protected using the CRC. The SA information is used to calculate a set of CRC parity bits. The scheduling information bits are divided by the CRC generator polynomial to generate 16 CRC parity bits. The CRC parity bits are then scrambled using the pre-defined CRC mask. The scrambled CRC is obtained by performing the bit-wise XOR operation of the 16 bit calculated CRC parity bits and bits of pre-defined CRC mask.

In an embodiment, the full destination UE's group ID is included in the MAC header, 16 MSBs of DST UE ID is included in the MAC header, and 8 LSBs of DST UE ID is included in the SA information.

The proposed technique can be used to indicate whether the D2D MAC PDU carries the unicast MAC SDUs or the groupcast MAC SDUs using the D2D MAC PDU format version number or scrambled CRC of the SA (i.e., scrambled CRC using the predefined CRC mask for the SA corresponding to the unicast D2D MAC PDU and unscrambled CRC for the SA corresponding to the non-unicast D2D MAC PDU. The proposed technique can be used to encode/decode the SRC/SRC GRP ID/DST UE ID/DST fields in case of unicast D2D MAC PDU and encode/decode the SRC/DST fields in case of non-unicast D2D MAC PDU.

Figure 8A:
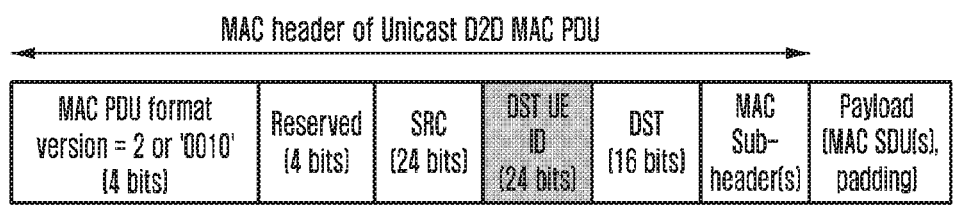
FIGS. 8a and 8b illustrate an example of a D2D MAC PDU format for unicast across groups, according to an embodiment as disclosed herein.
Figure 8B:
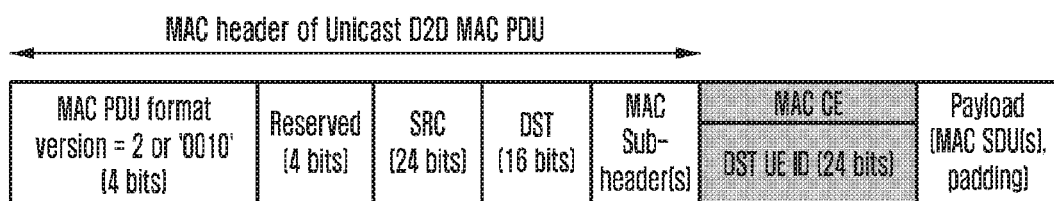

FIGS. 8a and 8b illustrates an example of the D2D MAC PDU format for unicast within groups, according to an embodiment as disclosed herein. Consider, the unicast D2D communication is established only within the members of a group. The MAC layer protocol in the communication unit 202 first determines whether the MAC SDU(s) to be transmitted in the D2D MAC PDU is for the unicast D2D communication or not. The MAC layer protocol receives information from the upper layers (e.g. RLC) along with the MAC SDU (i.e. RLC PDU) indicating whether the MAC SDU is for the unicast D2D communication or not. If the MAC SDU(s) is for unicast then MAC layer generates the D2D MAC PDU as follows.

The 4 bits D2D MAC PDU format version number is included in the MAC header and is set to 'X' (e.g. 0010 in binary or 2 in decimal) in the MAC header of the D2D MAC PDU. Note that, the D2D MAC PDU format version number in the MAC header is distinct for the unicast D2D MAC PDU and the non-unicast D2D MAC PDU. In an embodiment, if the scrambled CRC is used for the SA information corresponding to the unicast D2D MAC PDU then, 4 bits of D2D MAC PDU format version number may be set same for both unicast D2D MAC PDU and non-unicast D2D MAC PDU.

The 4 reserved bits following the D2D MAC PDU format number is set to zeros.

The 24 bits SRC field is included in the MAC header. The 24 bits SRC field in the MAC header of the D2D MAC PDU is set to D2D UE ID of the source UE 102. The D2D UE ID encoded in the SRC field is the unicast address of the source UE 102 and is unique within the group.

The 24 bits DST UE ID field is included in the MAC header. The 24 bits DST UE ID field in the MAC header of the D2D MAC PDU is set to the D2D UE ID of the destination UE 104. The D2D UE ID encoded in the DST UE field is the unicast address of the destination UE 104 of the group identified by the D2D Layer-2 Group ID encoded in the DST field in the MAC header and the SA.

The 16 bit DST field is also included in the MAC header. The 16 bits DST field in MAC header of D2D MAC PDU is set to 16 MSBs of D2D Layer-2 Group ID of the destination UE. This field identifies both source UE and Destination UE's group.

The MAC subheader(s) in the MAC header corresponding to MAC SDU(s) and/or padding is then included in the D2D MAC PDU payload.

In an embodiment, the DST UE ID can be included in MAC Control Element instead of MAC header as illustrated in the FIG. 8b.

The scheduling assignment including the 8 LSBs of source/destination UE's D2D Layer-2 group ID and the CRC bits is transmitted prior to transmission of the D2D MAC PDU. In an embodiment, the SA including the 8 LSBs of source/destination UE's D2D Layer-2 group ID and with scrambled CRC bits is transmitted prior to transmission of the D2D MAC PDU. The SA is protected using the CRC. The SA information is used to calculate the set of CRC parity bits. The scheduling information bits are divided by the CRC generator polynomial to generate 16 CRC parity bits. The CRC parity bits are then scrambled using the pre-defined CRC mask. The scrambled CRC is obtained by performing the bit-wise XOR operation of the 16 bit calculated CRC parity bits and bits of pre-defined CRC mask.

In an embodiment, the destination UE's group ID may be included in the MAC header and 16 MSBs of DST UE ID is included in the MAC header and 8 LSBs of DST UE ID is included in the SA information.

The proposed technique can be used to indicate whether the D2D MAC PDU carries the unicast MAC SDUs or groupcast MAC SDUs using the D2D MAC PDU format version number or scrambled CRC of scheduling assignment (i.e., scrambled CRC using the predefined CRC mask for the SA corresponding to the unicast D2D MAC PDU and unscrambled CRC for the SA corresponding to the non-unicast D2D MAC PDU.

The proposed method can be used to encode/decode the SRC/DST UE ID/DST fields in case of the unicast D2D MAC PDU and encode/decode the SRC/DST fields in case of non-unicast D2D MAC PDU.

Figure 9A:
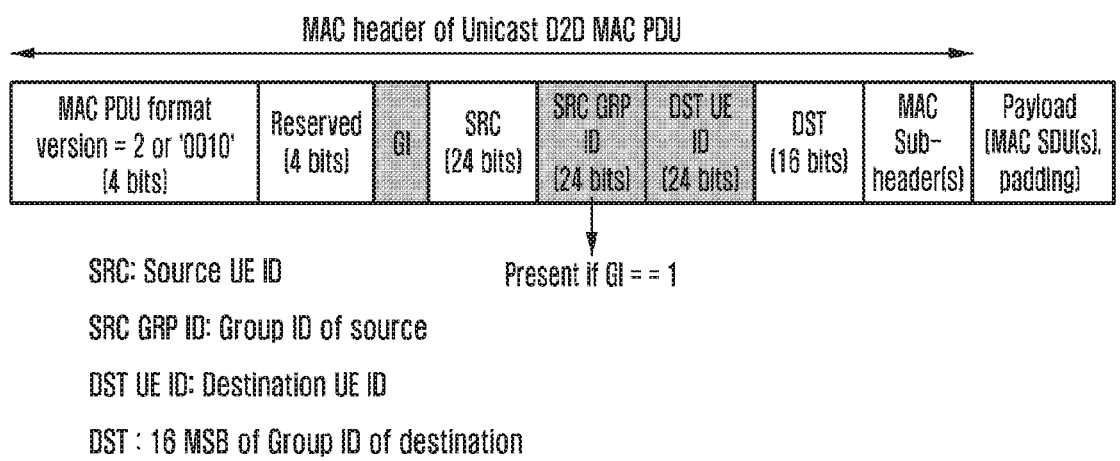
FIGS. 9a and 9b illustrate an example of a D2D MAC PDU format for unicast within group or across groups, according to an embodiment as disclosed herein.
Figure 9B:
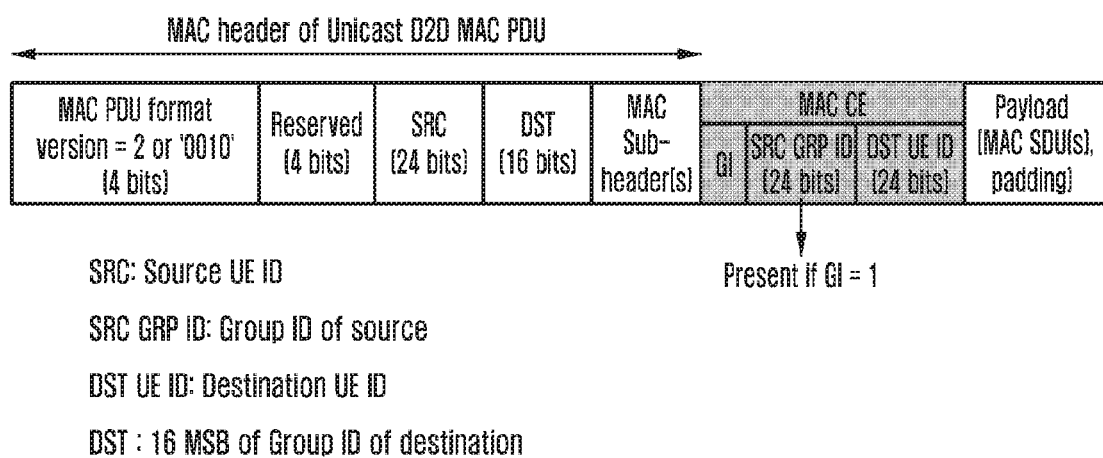

FIGS. 9a and 9b illustrate an example of the D2D MAC PDU format for unicast within group or across groups, according to an embodiment as disclosed herein. Consider the unicast D2D communication is established within the members of a group or across groups. The MAC layer protocol in the communication unit 202 first determines whether the MAC SDU(s) to be transmitted in the D2D MAC PDU is for the unicast D2D communication or not. The MAC layer protocol receives information from the upper layers (e.g. RLC layer) along with the MAC SDU (i.e. RLC PDU) indicating whether the MAC SDU is for the unicast D2D communication or not. If the MAC SDU(s) is for unicast then MAC layer generates the D2D MAC PDU as follows.

The 4 bits D2D MAC PDU format version number is included in MAC header and is set to 'X' (e.g. 0010 in binary or 2 in decimal) in the MAC header of the D2D MAC PDU. Note that D2D MAC PDU format version number in the MAC header is distinct for the unicast D2D MAC PDU and the non-unicast D2D MAC PDU. In an embodiment, if the scrambled CRC is used for the SA information corresponding to the unicast D2D MAC PDU then 4 bits of D2D MAC PDU format version number may be set same for both unicast and non-unicast D2D MAC PDU.

The 3 reserved bits following the D2D MAC PDU format version number is set to zeros.

The group indicator field is also included in the MAC header. It indicates whether destination UE is within same group as the source UE 102 or not. In an embodiment, the distinct D2D MAC PDU format version number can indicate whether destination UE is within same group as source UE or not.

The 24 bits SRC field is included in the MAC header. The 24 bits SRC field in the MAC header of the D2D MAC PDU is set to the D2D UE ID of the source UE 102. The D2D UE ID encoded in the SRC field is the unicast address of the source UE and is unique within the group.

The 24 bits SRC GRP ID field is included in the MAC header if group of source UE 102 and destination UE 104 is different. The 24 bits SRC GRP ID field in the MAC header of the D2D MAC PDU is set to D2D Layer-2 group ID of the source UE 102.

The 24 bits DST UE ID field is included in the MAC header. The 24 bits DST UE ID field in the MAC header of the D2D MAC PDU is set to the D2D UE ID of the destination UE 104. The D2D UE ID encoded in the DST UE field is the unicast address of the destination UE of the group identified by the D2D Layer-2 Group ID encoded in the DST field in the MAC header and the SA.

The 16 bit DST field is also included in the MAC header. The 16 bits DST field in the MAC header of the D2D MAC PDU is set to 16 MSBs of ProSe Layer-2 Group ID of the destination UE.

The MAC subheader(s) in the MAC header corresponding to the MAC SDU(s) and/or padding is then included in the D2D MAC PDU payload.

In an embodiment, the GI/DST UE ID/SRC GRP ID are included in the MAC Control Element instead of the MAC header as illustrated in the FIG. 9b.

In an embodiment, the destination UE's group ID may be included in the MAC header, 16 MSBs of DST UE ID is included in the MAC header, and 8 LSBs of DST UE ID is included in the SA information.

The SA including the 8 LSBs of destination UE's D2D Layer-2 Group ID and CRC bits is transmitted prior to transmission of D2D MAC PDU. In an embodiment, the SA including the 8 LSBs of destination UE's D2D Layer-2 Group ID and with scrambled CRC bits is transmitted prior to transmission of the D2D MAC PDU. The SA is protected using the CRC. The SA information is used to calculate the set of CRC parity bits. The scheduling information bits are divided by the CRC generator polynomial to generate 16 CRC parity bits. The CRC parity bits are then scrambled using the pre-defined CRC mask. The scrambled CRC is obtained by performing the bit-wise XOR operation of the 16 bit calculated CRC parity bits and bits of pre-defined CRC mask.

The proposed technique can be used to indicate whether the D2D MAC PDU carries the unicast MAC SDUs or the groupcast MAC SDUs using the D2D MAC PDU format version number or scrambled CRC of the SA (i.e., scrambled CRC using the predefined CRC mask for the SA corresponding to the unicast D2D MAC PDU and unscrambled CRC for the SA corresponding to the non-unicast D2D MAC PDU).

The proposed technique can be used to indicate whether the destination UE is in same group as the source UE by including the group indicator field. The proposed technique can be used to encode/decode the SRC/DST UE ID/DST fields in case of unicast D2D MAC PDU for the unicast D2D communication within the group. The proposed technique can be used to encode/decode the SRC/SRC GRP ID/DST UE ID/DST fields in case of unicast D2D MAC PDU for the unicast D2D communication across the group.

Figure 10A:
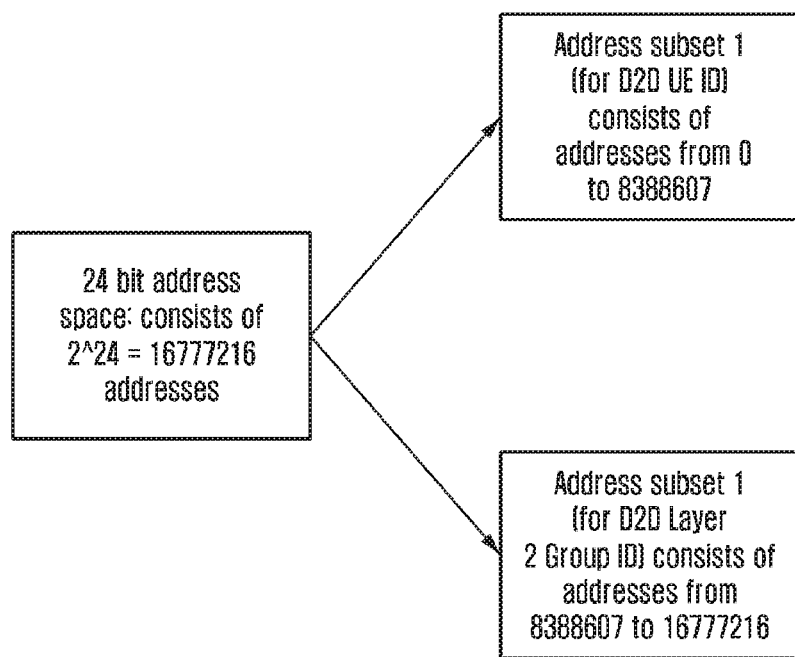
FIG. 10a illustrates a process for partitioning a N bit address space for generating a D2D MAC PDU format, according to an embodiment as disclosed herein.

FIG. 10a illustrates a process for partitioning an N bit address space for generating the D2D MAC PDU format, according to an embodiment as disclosed herein. Consider the unicast D2D communication is established within the members of the group or across groups. In this method 'N' bit address space is partitioned into two address subsets (i.e., address subset 1, and address subset 2). The partitioning is done such that each address subset has distinct addresses. The number of addresses in each subset may be same or different. In an example, the partitioning of 24 bit address (i.e. D2D UE ID and D2D Group ID size is 24 bits) is shown in the FIG. 10a. Each group is assigned the distinct address (i.e. D2D Group ID) from the Address subset 2. Each group member is assigned an address (i.e. D2D UE ID) from the Address subset 1. The group members are assigned address such that each member of the group has distinct address. The group member of the distinct groups can have same address. The advantage of this partitioning is that there is no collision between the D2D UE ID and the D2D Layer 2 Group ID. In order to uniquely identify the UE across the groups both D2D UE ID and D2D Layer 2 Group ID needs to be transmitted in the D2D MAC PDU.

Figure 10B:
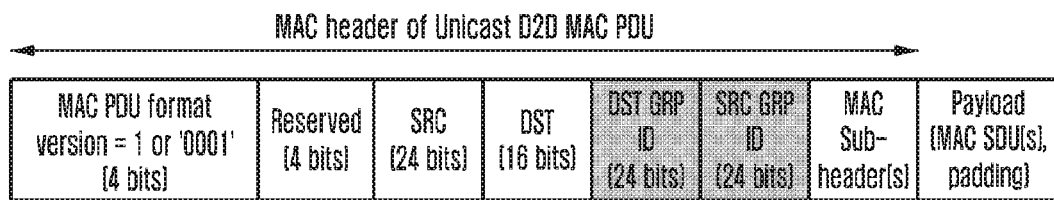
FIG. 10b illustrates an example of a D2D MAC PDU format for unicast across groups, according to an embodiment as disclosed herein.

The D2D MAC PDU format is illustrated in the FIG. 10b The MAC layer protocol in the communication unit 202 first determines whether the MAC SDU(s) to be transmitted in the D2D MAC PDU is for the unicast D2D communication or not. The MAC layer protocol receives information from the upper layers (e.g. RLC layer) along with the MAC SDU (i.e. RLC PDU) indicating whether the MAC SDU is for the unicast D2D communication or the groupcast D2D communication. If the MAC SDU(s) is for the unicast D2D communication then, the MAC layer generates the D2D MAC PDU as follows.

The 4 bits D2D MAC PDU format version number is included in the MAC header and is set to '0001' (i.e. decimal value 1) in the MAC header of the D2D MAC PDU. Note that D2D MAC PDU format version number in the MAC header is same for the unicast D2D MAC PDU and the non-unicast D2D MAC PDU. In an embodiment, the D2D MAC PDU format version number in the MAC header can be distinct for the unicast D2D MAC PDU and the non-unicast D2D MAC PDU.

The 4 reserved bits following the D2D MAC PDU format number is set to zeros.

The 24 bits SRC field is included in the MAC header. The 24 bits SRC field in the MAC header of the D2D MAC PDU is set to the D2D UE ID of the source UE 102. The D2D UE ID encoded in the SRC field is the unicast address of the source UE 102 and is unique within the group.

The 16 bit DST field is also included in the MAC header. The 16 bits DST field in the MAC header of the D2D MAC PDU is set to 16 MSBs of the D2D UE ID of the destination UE 104.

The 24 bits SRC GRP ID field is included in the D2D MAC header. The 24 bits SRC GRP ID field in the MAC header of the D2D MAC PDU is set to the D2D Layer-2 Group ID of the source UE 102. This field is included only if D2D UE ID of Destination UE 104 is included in the DST field.

The 24 bits DST GRP ID field is included in the MAC header. The 24 bits DST GRP ID field in the MAC header of the D2D MAC PDU is set to D2D Layer-2 Group ID of the Destination UE 104. This field is included only if the D2D UE ID of the destination UE 104 is included in the DST field.

The MAC subheader(s) in the MAC header corresponding to MAC SDU(s) and/or padding is then included in the D2D MAC PDU payload.

In an embodiment, the DST GRP ID/SRC GRP ID can be included in the MAC Control Element instead of MAC header.

Figure 10C:
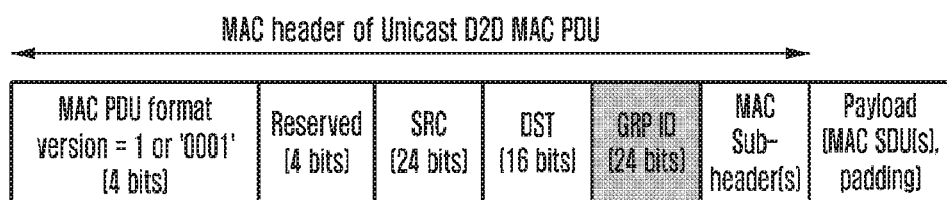
FIG. 10c illustrates an example of a D2D MAC PDU for unicast within group, according to an embodiment as disclosed herein.

In an embodiment, the unicast D2D communication is only allowed within the group, only one GRP ID is included in MAC header or MAC CE as illustrated in the FIG. 10c.

Figure 10D:
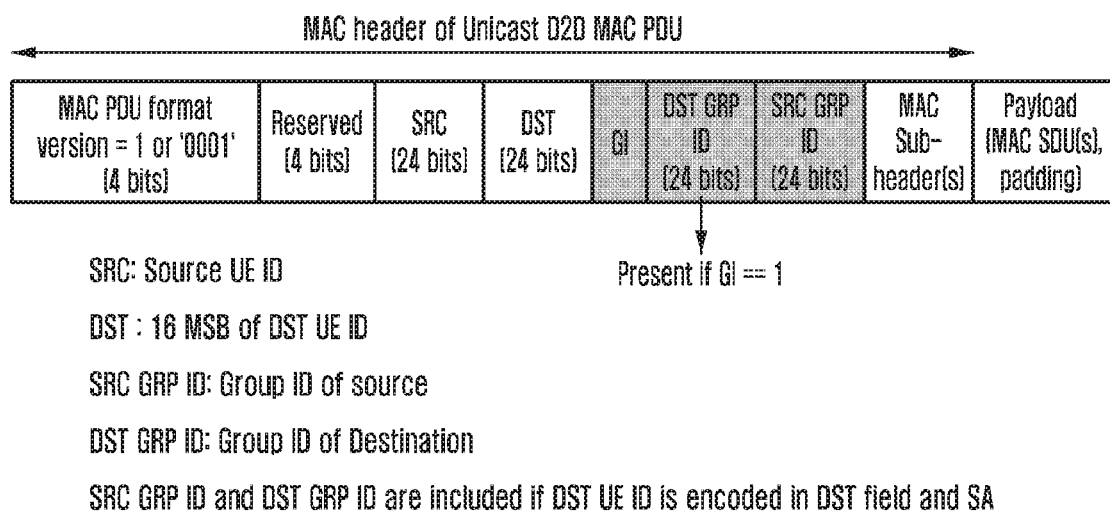
FIG. 10d illustrates an example of a D2D MAC PDU format for unicast across groups, according to an embodiment as disclosed herein.

In an embodiment, the unicast D2D communication is allowed within the groups as well as across the groups, the Group indication (GI) field can be included to indicate whether both SRC GRP ID and DST GRP ID are present or only one of them is present as illustrated in the FIG. 10d. Instead of GI different value if the D2D MAC PDU format version number can also indicate whether both SRC GRP ID and DST GRP ID are present or only one of them is present.

The SA including the 8 LSBs of destination UE's D2D UE ID and CRC bits is transmitted prior to transmission of the D2D MAC PDU. In an embodiment, the scheduling assignment including the 8 LSBs of destination UE's D2D UE ID and with scrambled CRC bits is transmitted prior to transmission of the D2D MAC PDU. The SA is protected using the CRC. The SA information is used to calculate the set of CRC parity bits. The scheduling information bits are divided by the CRC generator polynomial to generate 16 CRC parity bits. The CRC parity bits are then scrambled using the pre-defined CRC mask. The scrambled CRC is obtained by performing the bit-wise XOR operation of the 16 bit calculated CRC parity bits and bits of pre-defined CRC mask.

The proposed method allows the receiving unit to determine presence of GI/SRC GRP ID/DST GRP ID fields in the D2D MAC PDU if D2D UE ID is encoded in the DST field and SA information.

In an embodiment, the 'N' bit address space is partitioned into two address subsets (i.e., address subset 1 and address subset 2). The partitioning is done such that each address subset has distinct addresses. The number of addresses in each subset may be same or different. In an example, the partitioning of 24 bit address (i.e. D2D UE ID and D2D Group ID size is 24 bits) is shown in the FIG. 10a. Each group is assigned the distinct address (i.e. D2D Group ID) from the address subset 2. Each UE is assigned an address (i.e. D2D UE ID) from the address subset 1. Each UE (irrespective of group which it belongs) is assigned a distinct address from address subset 1. The proposed method avoids the collision between the D2D UE ID and the D2D Layer 2 Group ID. The proposed method avoids the collision between D2D UE ID of two UEs.

Consider the unicast D2D communication is established within the members of the group or across the groups. During the unicast D2D MAC PDU generation, the SRC field and the DST field are set to source D2D UE ID and 16 MSBs of destination D2D UE ID respectively. 8 LSBS of destination D2D UE ID are set in SA.

Figure 11:
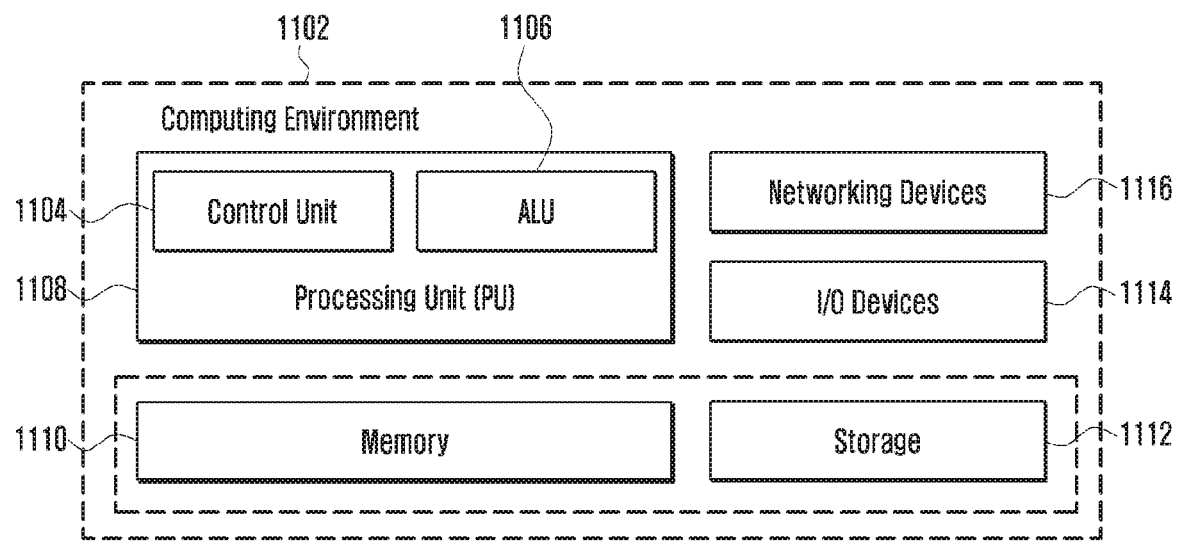
FIG. 11 illustrates a computing environment implementing the mechanism for discriminating a unicast D2D communication and a groupcast D2D communication in a D2D communication, according to an embodiment as disclosed herein.

FIG. 11 illustrates a computing environment 1102 implementing the mechanism for discriminating the unicast D2D communication and the groupcast D2D communication in the D2D communication, according to an embodiment as disclosed herein. As depicted in the figure, the computing environment 1102 comprises at least one processing unit 1108 that is equipped with a control unit 1104, an Arithmetic Logic Unit (ALU) 1106, a memory 1110, a storage unit 1112, a plurality of networking devices 1116 and a plurality Input output (I/O) devices 1114. The processing unit 1108 is responsible for processing the instructions of the technique. The processing unit 1108 receives commands from the control unit 1104 in order to perform its processing. Further, any logical and arithmetic operations involved in the execution of the instructions are computed with the help of the ALU 1106.

The overall computing environment 1102 can be composed of multiple homogeneous or heterogeneous cores, multiple CPUs of different kinds, special media and other accelerators. The processing unit 1108 is responsible for processing the instructions of the technique. Further, the plurality of processing units 1104 may be located on a single chip or over multiple chips.

The technique comprising of instructions and codes required for the implementation are stored in either the memory unit 1110 or the storage 1112 or both. At the time of execution, the instructions may be fetched from the corresponding memory 1110 or storage 1112, and executed by the processing unit 1108.

In case of any hardware implementations various networking devices 1116 or external I/O devices 1114 may be connected to the computing environment 1102 to support the implementation through the networking unit and the I/O device unit.

The embodiments disclosed herein can be implemented through at least one software program running on at least one hardware device and performing network management functions to control the elements. The elements shown in the FIGS. 1 to 11 include blocks, elements, actions, acts, steps, or the like which can be at least one of a hardware unit, a software unit or a combination of hardware unit and software unit.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for device to device (D2D) communication of a terminal, the method comprising:
    determining whether first information indicating which version of a sidelink shared channel (SL-SCH) sub-header is used is set to 0001 or 0010; and
    generating a media access control (MAC) protocol data unit (PDU) including a MAC service data unit (SDU) and a MAC header comprising the first information and second information,
    wherein the second information is for identifying a destination group or a destination terminal based on the first information,
    wherein the second information is a groupcast identifier, in case that the first information is set to 0001, and
    wherein the second information is a unicast identifier, in case that the first information is set to 0010.

2. The method of claim 1, wherein the second information carries 16 most significant bits of a destination layer-2 identifier, and the destination layer-2 identifier is set to a destination group identifier or a destination terminal identifier.

3. The method of claim 1, wherein the MAC header further comprises third information for identifying the terminal.

4. The method of claim 1, wherein the first information is included in MAC PDU format version number field of the MAC header and the second information is included in destination (DST) field in the MAC header.

5. A method for device to device (D2D) communication of a first terminal, the method comprising:

identifying a media access control (MAC) protocol data unit (PDU) including a MAC service data unit (SDU) and a MAC header comprising first information and second information;

identifying that the first information indicating which version of a sidelink shared channel (SL-SCH) subheader is used is set to 0001 or 0010; and determining whether the second information is a groupcast identifier or a unicast identifier based on the first information, wherein the second information is for identifying a destination group or a destination terminal based on the first information, wherein the second information is the groupcast identifier, in case that the first information is set to 0001, and wherein the second information is the unicast identifier, in case that the first information is set to 0010.

6. The method of claim 5, wherein the second information carries 16 most significant bits of a destination layer-2 identifier, and the destination layer-2 identifier is set to a destination group identifier or a destination terminal identifier.

7. The method of claim 5, wherein the MAC header further comprises third information for identifying a second terminal generating the MAC PDU.

8. The method of claim 5, wherein the first information is included in MAC PDU format version number field of the MAC header and the second information is included in destination (DST) field in the MAC header.

9. A terminal for device to device (D2D) communication, the terminal comprising:
a transceiver; and
at least one processor configured to:
determine whether first information indicating which version of a sidelink shared channel (SL-SCH) subheader is used is set to 0001 or 0010, and
generate a media access control (MAC) protocol data unit (PDU including a MAC service data unit (SDU) and a MAC header comprising the first information and second information,
wherein the second information is for identifying a destination group or a destination terminal based on the first information,
wherein the second information is a groupcast identifier, in case that the first information is set to 0001, and
wherein the second information is a unicast identifier, in case that the first information is set to 0010.

10. The terminal of claim 9, wherein the second information carries 16 most significant bits of a destination layer-2 identifier, and the destination layer-2 identifier is set to a destination group identifier or a destination identifier.

11. The terminal of claim 9, wherein the MAC header further comprises third information for identifying the terminal.

12. The terminal of claim 9, wherein the first information is included in MAC PDU format version number field of the MAC header and the second information is included in destination (DST) field in the MAC header.

13. A terminal for device to device (D2D) communication, the terminal comprising:
a transceiver; and
at least one processor configured to:
identify a media access control (MAC) protocol data unit (PDU) including a MAC service data unit (SDU) and a MAC header comprising first information and second information,
identify that the first information indicating which version of a sidelink shared channel (SL-SCH) subheader is used is set to 0001 or 0010, and
determine whether the second information is a groupcast identifier or a unicast identifier based on the first information,
wherein the second information is for identifying a destination group or a destination terminal based on the first information,
wherein the second information is the groupcast identifier, in case that the first information is set to 0001, and
wherein the second information is the unicast identifier, in case that the first information is set to 0010.

14. The terminal of claim 13, wherein the second information carries 16 most significant bits of a destination layer-2 identifier, and the destination layer-2 identifier is set to a destination group identifier or a destination identifier.

15. The terminal of claim 13, wherein the MAC header further comprises third information for identifying another terminal generating the MAC PDU.

16. The terminal of claim 13, wherein the first information is included in MAC PDU format version number field of the MAC header and the second information is included in destination (DST) field in the MAC header.

* * * * *